(12) United States Patent
Sumiuchi et al.

(10) Patent No.: US 10,489,173 B2
(45) Date of Patent: Nov. 26, 2019

(54) INFORMATION PROCESSING APPARATUS, CONTROL METHOD AND STORAGE MEDIUM STORING A PROGRAM

(71) Applicant: CANON KABUSHIKI KAISHA, Tokyo (JP)

(72) Inventors: Kazuyoshi Sumiuchi, Kawasaki (JP); Mitsuru Konji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/459,616

(22) Filed: Mar. 15, 2017

(65) Prior Publication Data

US 2017/0286134 A1    Oct. 5, 2017

(30) Foreign Application Priority Data

Mar. 31, 2016 (JP) .................................. 2016-073181

(51) Int. Cl.
  *G06F 3/048* (2013.01)
  *G06F 9/451* (2018.01)
  (Continued)

(52) U.S. Cl.
  CPC ........ *G06F 9/453* (2018.02); *H04M 1/72527* (2013.01); *H04N 1/00307* (2013.01);
  (Continued)

(58) Field of Classification Search
  CPC .... G06F 3/1292; G06F 3/1236; G06F 3/1205; G06F 3/124; G06F 3/125; G06F 3/1229; G06F 3/1291
  See application file for complete search history.

(56) References Cited

U.S. PATENT DOCUMENTS 6,980,319 B2   12/2005   Ohta
7,170,857 B2    1/2007   Stephens et al.
(Continued)

FOREIGN PATENT DOCUMENTS

CN   102378365 A    3/2012
CN   104216733 A   12/2014
(Continued)

OTHER PUBLICATIONS

Toshihiro Yokoyama et al., U.S. Appl. No. 16/133,124, filed Sep. 17, 2018.
(Continued)

*Primary Examiner* — Linh K Pham
(74) *Attorney, Agent, or Firm* — Venable LLP

(57) ABSTRACT

A control method for an information processing apparatus includes causing a display unit to display a screen including an accepting item for accepting a user instruction so as to perform setup processing that allows a communication apparatus that has transmitted first information to connect with an external access point, and performing the setup processing in which second information relating to the external access point is transmitted to the communication apparatus by a first wireless communication standard, in a case where the user instruction is performed on the accepting item. A connection between the communication apparatus and the external access point is performed based on the second information transmitted by the first wireless communication standard, and thus the information processing apparatus is able to communicate with the communication apparatus via the external access point by the communication based on a second wireless communication standard.

26 Claims, 11 Drawing Sheets

(51) Int. Cl.
  *H04M 1/725* (2006.01)
  *H04N 1/00* (2006.01)
  *H04N 1/32* (2006.01)
  *H04N 1/327* (2006.01)

(52) U.S. Cl.
  CPC ..... *H04N 1/32122* (2013.01); *H04N 1/32797* (2013.01); *H04N 2201/0013* (2013.01); *H04N 2201/0055* (2013.01); *H04N 2201/0075* (2013.01); *H04N 2201/0094* (2013.01)

(56) References Cited

U.S. PATENT DOCUMENTS

| | | |
|---|---|---|
| 7,392,046 B2 | 6/2008 | Leib et al. |
| 7,414,747 B2 | 8/2008 | Ohta |
| 7,746,834 B1 | 6/2010 | Moore et al. |
| 7,805,382 B2 | 9/2010 | Rosen et al. |
| 7,940,744 B2 | 5/2011 | Lehotsky et al. |
| 8,213,355 B2 | 7/2012 | Matsuo |
| 8,331,334 B2 | 12/2012 | Quigley et al. |
| 8,443,071 B2 | 5/2013 | Lu et al. |
| 8,532,304 B2 | 9/2013 | Asokan et al. |
| 8,769,064 B2 | 7/2014 | Won et al. |
| 9,015,288 B2 | 4/2015 | Kawai et al. |
| 9,041,965 B2 | 5/2015 | Asai |
| 9,047,743 B2 | 6/2015 | Gulin et al. |
| 9,065,944 B2 | 6/2015 | Asai |
| 9,246,924 B2 | 1/2016 | Sukumaran et al. |
| 9,258,712 B2 | 2/2016 | Kiukkonen et al. |
| 9,313,687 B2 | 4/2016 | Knutson |
| 9,369,606 B2 * | 6/2016 | Tredoux ............... G06F 3/1204 |
| 9,459,822 B2 * | 10/2016 | Kang .................. G06F 3/1292 |
| 9,467,562 B2 | 10/2016 | Bozionek et al. |
| 9,477,690 B2 | 10/2016 | Lucero et al. |
| 9,538,023 B2 | 1/2017 | Sato et al. |
| 9,538,561 B2 | 1/2017 | Qi |
| 9,629,077 B2 | 4/2017 | Sumiuchi |
| 9,648,180 B2 | 5/2017 | Sasase |
| 9,674,378 B2 | 6/2017 | Iwauchi |
| 9,679,310 B1 | 6/2017 | Saltzstein et al. |
| 9,706,339 B2 | 7/2017 | Cho et al. |
| 9,794,426 B2 | 10/2017 | Kurihara |
| 9,823,888 B2 | 11/2017 | Kawasaki |
| 9,836,260 B2 | 12/2017 | Iwauchi |
| 9,898,231 B2 | 2/2018 | Kang et al. |
| 9,999,077 B2 | 6/2018 | Sumiuchi et al. |
| 10,275,368 B2 | 4/2019 | Ito et al. |
| 2001/0029531 A1 * | 10/2001 | Ohta ................... H04W 48/00 709/223 |
| 2003/0095524 A1 | 5/2003 | Stephens et al. |
| 2003/0158796 A1 | 8/2003 | Balent |
| 2005/0005042 A1 | 1/2005 | Fukunaga et al. |
| 2005/0097046 A1 | 5/2005 | Singfield |
| 2005/0148326 A1 | 7/2005 | Nogawa et al. |
| 2006/0002352 A1 | 1/2006 | Nakamura |
| 2006/0012828 A1 | 1/2006 | Ohta |
| 2006/0154642 A1 | 7/2006 | Scannell |
| 2006/0224707 A1 | 10/2006 | Kawai et al. |
| 2006/0229896 A1 | 10/2006 | Rosen et al. |
| 2006/0230420 A1 | 10/2006 | Kawai et al. |
| 2006/0258289 A1 | 11/2006 | Dua |
| 2007/0115819 A1 | 5/2007 | Stephens et al. |
| 2007/0146782 A1 | 6/2007 | Lehotsky et al. |
| 2007/0237102 A1 | 10/2007 | Trott |
| 2007/0242819 A1 | 10/2007 | Bozionek et al. |
| 2007/0264991 A1 | 11/2007 | Jones et al. |
| 2008/0261526 A1 | 10/2008 | Suresh |
| 2008/0261640 A1 | 10/2008 | Yoshida |
| 2008/0288423 A1 | 11/2008 | Eastman |
| 2009/0103124 A1 * | 4/2009 | Kimura ................. G06F 3/1204 358/1.15 |
| 2009/0157799 A1 | 6/2009 | Sukumaran et al. |
| 2009/0207445 A1 * | 8/2009 | Kimura .............. H04N 1/00307 358/1.15 |
| 2009/0239467 A1 | 9/2009 | Gulin et al. |
| 2010/0017847 A1 | 1/2010 | Kawai et al. |
| 2010/0232408 A1 | 9/2010 | Jim-Mook |
| 2011/0177780 A1 | 7/2011 | Sato et al. |
| 2011/0317211 A1 | 12/2011 | Yamada et al. |
| 2012/0013927 A1 | 1/2012 | Asai |
| 2012/0052802 A1 | 3/2012 | Kasslin et al. |
| 2012/0062734 A1 | 3/2012 | Mironichev et al. |
| 2012/0151023 A1 | 6/2012 | Won et al. |
| 2012/0190299 A1 | 7/2012 | Takatsuka et al. |
| 2012/0326962 A1 | 12/2012 | Asai |
| 2013/0006750 A1 | 1/2013 | Simmons |
| 2013/0018960 A1 | 1/2013 | Knysz et al. |
| 2013/0086245 A1 | 4/2013 | Lu et al. |
| 2013/0227647 A1 | 8/2013 | Thomas et al. |
| 2013/0258402 A1 | 10/2013 | Arai |
| 2013/0260683 A1 | 10/2013 | Suzuki et al. |
| 2014/0068719 A1 | 3/2014 | Kiukkonen et al. |
| 2014/0127994 A1 | 5/2014 | Nightingale et al. |
| 2014/0176980 A1 | 6/2014 | Asai |
| 2014/0222855 A1 | 8/2014 | Lucero et al. |
| 2014/0229387 A1 | 8/2014 | Chow |
| 2014/0351444 A1 | 11/2014 | Qi et al. |
| 2014/0355047 A1 * | 12/2014 | Lee ...................... G06F 3/1292 358/1.15 |
| 2014/0355048 A1 * | 12/2014 | Kang ................... G06F 3/1292 358/1.15 |
| 2014/0368878 A1 * | 12/2014 | Asai .................. H04N 1/00408 358/1.15 |
| 2015/0023334 A1 | 1/2015 | Suga |
| 2015/0131642 A1 | 5/2015 | Amano |
| 2015/0187177 A1 | 7/2015 | Warner et al. |
| 2015/0201443 A1 | 7/2015 | Emani et al. |
| 2015/0237527 A1 | 8/2015 | Knutson |
| 2015/0248265 A1 | 9/2015 | Kang et al. |
| 2015/0264650 A1 | 9/2015 | Sekine |
| 2015/0264736 A1 | 9/2015 | Gulin et al. |
| 2015/0304805 A1 | 10/2015 | Suzuki et al. |
| 2015/0327069 A1 | 11/2015 | Fu |
| 2015/0355875 A1 | 12/2015 | Matsushita et al. |
| 2015/0382136 A1 | 12/2015 | Mihira et al. |
| 2016/0062717 A1 | 3/2016 | Kawasaki |
| 2016/0119039 A1 | 4/2016 | Soliman et al. |
| 2016/0162224 A1 | 6/2016 | Sato |
| 2016/0165384 A1 | 6/2016 | Amano |
| 2016/0165385 A1 | 6/2016 | Fujisawa |
| 2016/0174119 A1 | 6/2016 | Goto |
| 2016/0198403 A1 * | 7/2016 | Sumiuchi ............. H04W 8/005 455/434 |
| 2016/0198498 A1 | 7/2016 | Wada |
| 2016/0261975 A1 | 9/2016 | Kurihara |
| 2016/0323744 A1 | 11/2016 | Yang et al. |
| 2016/0338120 A1 | 11/2016 | Boyle |
| 2016/0360349 A1 | 12/2016 | Goto |
| 2016/0373594 A1 | 12/2016 | Kurihara |
| 2016/0378410 A1 * | 12/2016 | Inoue .................. G06F 3/1236 358/1.15 |
| 2017/0006166 A1 | 1/2017 | Sumiuchi |
| 2017/0099356 A1 | 4/2017 | Qi et al. |
| 2017/0181078 A1 | 6/2017 | Sumiuchi |
| 2017/0208431 A1 | 7/2017 | Suzuki et al. |
| 2017/0215113 A1 | 7/2017 | Lee et al. |
| 2017/0223579 A1 | 8/2017 | Lee et al. |
| 2017/0223615 A1 | 8/2017 | Lee et al. |
| 2017/0223748 A1 | 8/2017 | Sumiuchi et al. |
| 2017/0245314 A1 * | 8/2017 | Ohhira ................. H04W 76/14 |
| 2017/0264697 A1 | 9/2017 | Qi et al. |
| 2017/0265027 A1 * | 9/2017 | Najari ................... H04W 4/02 |
| 2017/0280458 A1 | 9/2017 | Lou et al. |
| 2017/0289393 A1 | 10/2017 | Yokoyama et al. |
| 2018/0132305 A1 | 5/2018 | Sumiuchi et al. |
| 2019/0075442 A1 | 3/2019 | Suzuki et al. |

FOREIGN PATENT DOCUMENTS

| | | |
|---|---|---|
| CN | 104539323 A | 4/2015 |
| CN | 104881377 A | 9/2015 |
| EP | 1793531 A1 | 6/2007 |
| EP | 2725774 A2 | 4/2014 |

(56) References Cited

FOREIGN PATENT DOCUMENTS

| | | |
|---|---|---|
| JP | 2007-048211 A | 2/2007 |
| JP | 2007-049368 | 2/2007 |
| JP | 2010-067215 A | 3/2010 |
| JP | 2011-113262 A | 6/2011 |
| JP | 2012-230574 A | 11/2012 |
| JP | 2013-219430 A | 10/2013 |
| JP | 2014-207532 A | 10/2014 |
| JP | 2016-034209 A | 3/2016 |
| WO | 2015/175436 A1 | 11/2015 |

OTHER PUBLICATIONS

Chinese Office Action dated Jul. 22, 2019, in related Chinese Patent Application No. 201710177596.6 (with English translation).
Japanese Office Action dated Jul. 29, 2019, in related Japanese Patent Application No. 2016-073181.

* cited by examiner

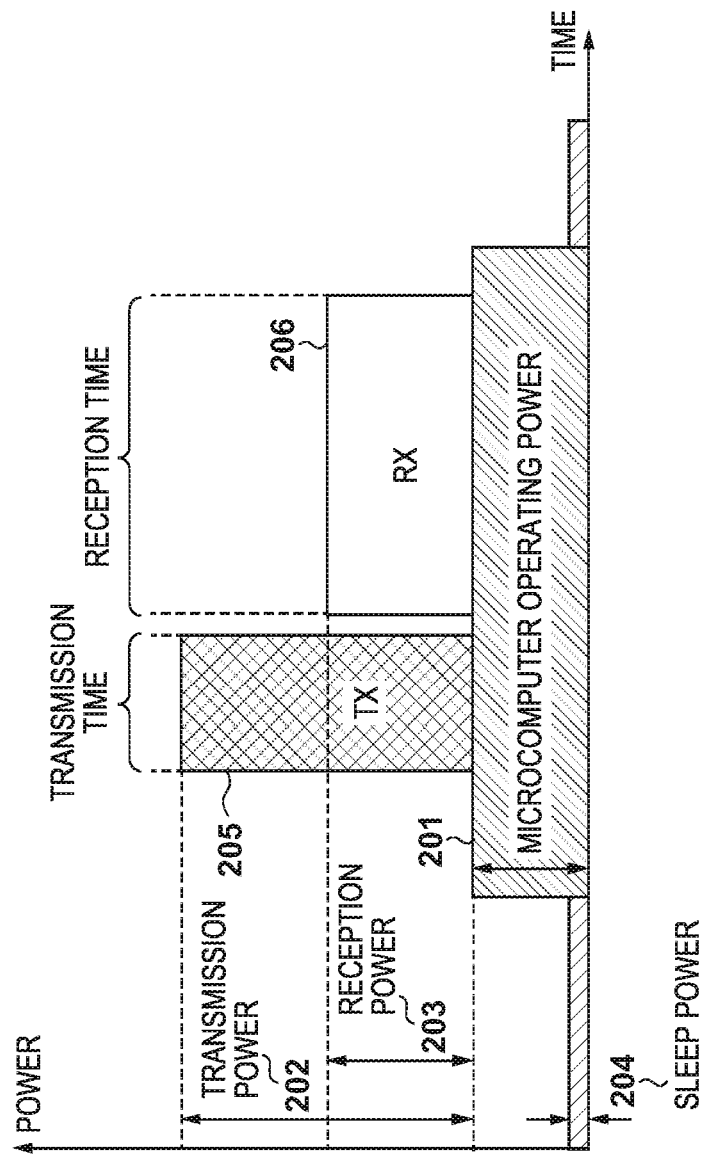

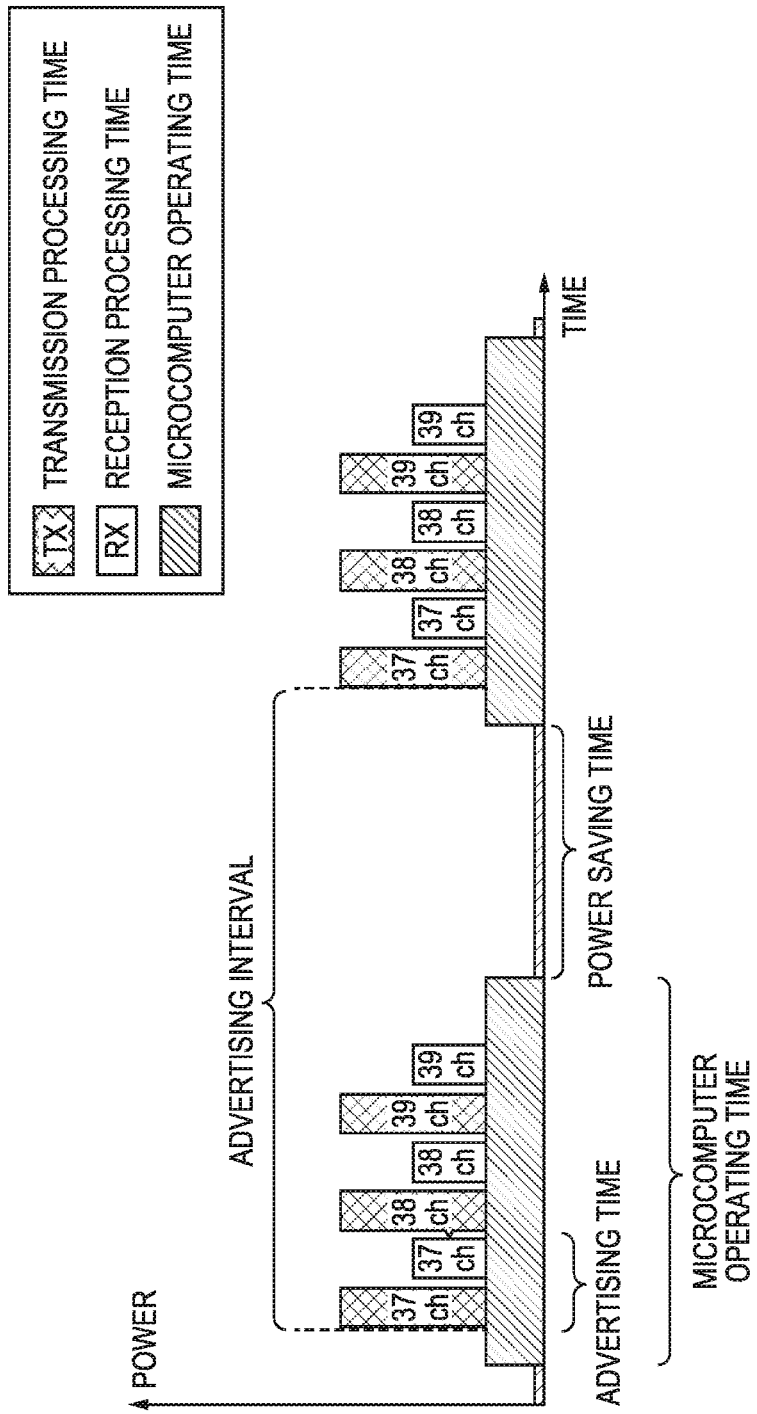

https://www.aaa.com/rd.cgi?FUNC=GUIDE&MODEL=PRINTER_X&CNT=JP&ID=YYYY/

- SERVER ADDRESS
- IDENTIFIER INDICATING OPERATION EXPLANATION
- IDENTIFIER INDICATING MODEL NAME (MODEL NAME: PRINTER_X)
- IDENTIFIER INDICATING SALE REGION (SALE REGION: JP(JAPAN))
- IDENTIFIER INDICATING SCREEN ID (SCREEN ID: YYYY)

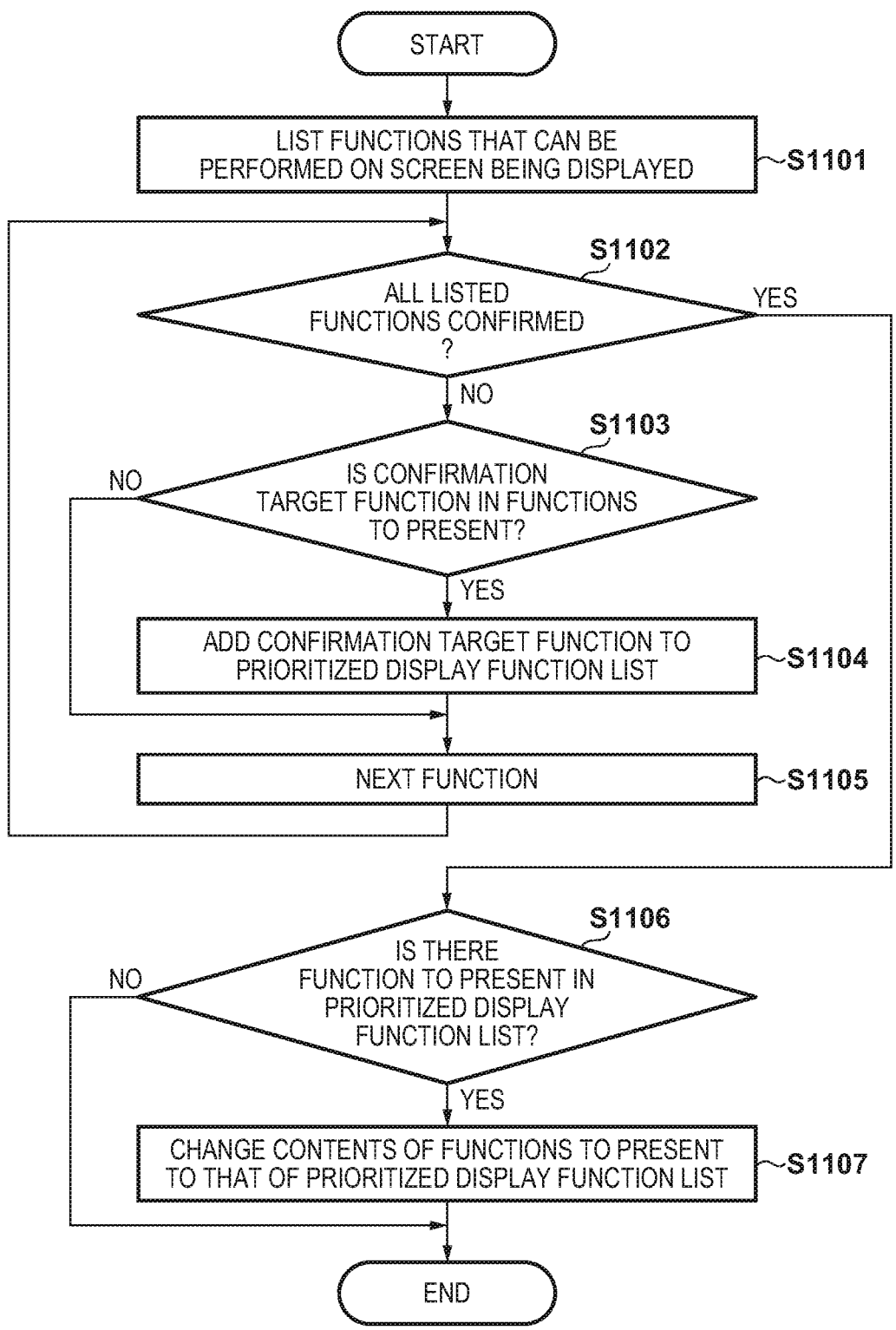

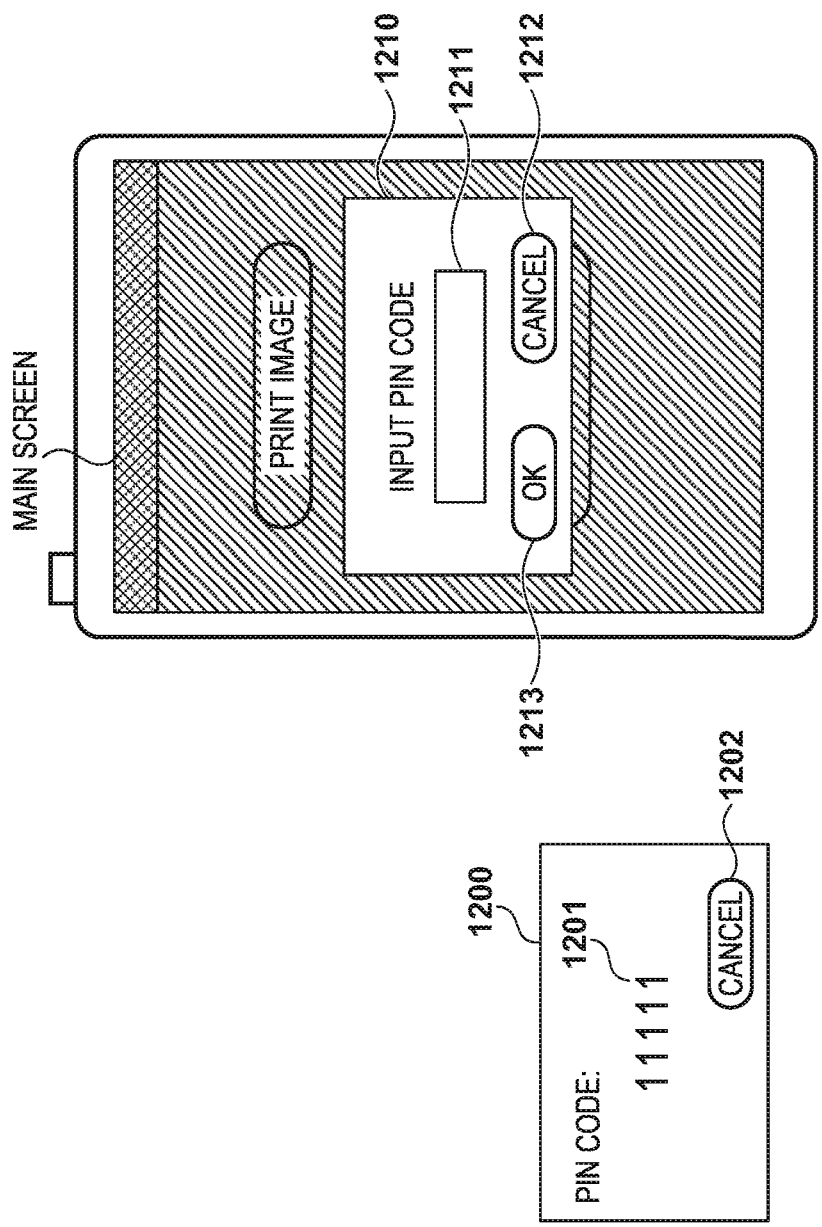

INFORMATION PROCESSING APPARATUS, CONTROL METHOD AND STORAGE MEDIUM STORING A PROGRAM

BACKGROUND OF THE INVENTION

Field of the Invention

The present invention relates to an information processing apparatus capable of wireless communication, a method of controlling the same, and a storage medium storing a program.

Description of the Related Art

There is a problem in that, in printers, copying machines, and the like, operation has become complicated accompanying an increase in the number of functions, and it is thereby difficult for a user to execute target processing, and there is a problem in that it is cumbersome to execute a desired operation. Displaying guide information on an operation screen is recited in Japanese Patent Laid-Open No. 2007-49368 to deal with such problems. In Japanese Patent Laid-Open No. 2007-49368, it is recited that operations whose frequency of usage is high are displayed preferentially in the operation guide.

However, operations whose frequency of usage is high do not necessarily correspond to the processing that a user wishes to execute, and so there is a problem in that appropriate guidance cannot be performed in apparatus setting, and therefore further improvement of user convenience is desired.

SUMMARY OF THE INVENTION

An aspect of the present invention is to eliminate the above-mentioned problems with the conventional technology. The present invention provides an information processing apparatus, a control method which improves convenience in a display of a screen for using functions of an apparatus, and a storage medium storing a program.

The present invention in one aspect provides an information processing apparatus, comprising: an obtainment unit configured to obtain apparatus information of an external apparatus by a wireless communication; and a display control unit configured to cause a display unit to display a screen that an application for causing the external apparatus to execute a function provides, wherein the display control unit causes the display unit to display a guidance screen that guides to execution of a recommended function based on the apparatus information obtained by the obtainment unit.

By virtue of the present invention, it is possible to improve convenience in display of a screen for using functions of an apparatus.

Further features of the present invention will become apparent from the following description of exemplary embodiments with reference to the attached drawings.

BRIEF DESCRIPTION OF THE DRAWINGS

FIG. 2 is a view for describing transmission of advertising information and reception of a GATT communication start request.

FIG. 3 is a view for describing transmission of advertising information and reception of a GATT communication start request.

FIG. 11 is a flowchart illustrating processing for changing presented function selection details.

FIGS. 12A and 12B are views illustrating screens for a time of a pairing process.

DESCRIPTION OF THE EMBODIMENTS

Figure 1:
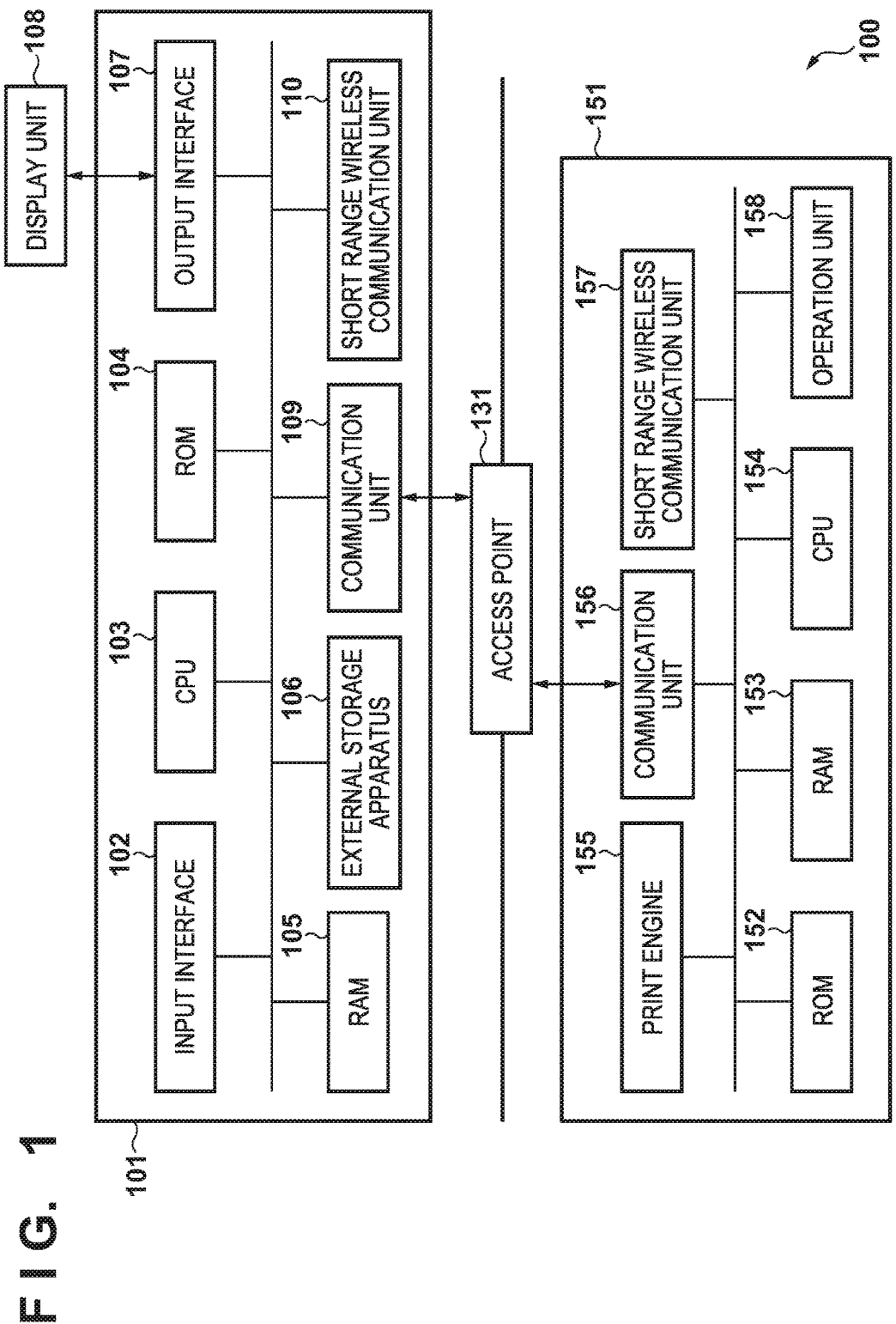
FIG. 1 is a view illustrating a configuration of a communication system.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

First Embodiment

FIG. 1 is a view illustrating a configuration of a communication system 100 in the present embodiment. The communication system 100 includes an information processing apparatus 101 and a communication apparatus 151. In the present embodiment, description will be given with the examples of a smart phone as the information processing apparatus and a printer as the communication apparatus. Note that a smart phone is exemplified in the present embodiment as the information processing apparatus 101, but limitation is not made to this, and various things, such as a mobile terminal, a notebook PC, a tablet terminal, a PDA (Personal Digital Assistant), or a digital camera can be applied. Also, while a printer is exemplified in the present embodiment as the communication apparatus 151, limitation is not made to this, and various things can be applied if they are apparatuses that can perform wireless communication with the information processing apparatus 101. For example, in the case of a printer, an ink-jet printer, a full color laser beam printer, a monochrome printer, or the like can be applied. Also, not only printers, but also copying machines, facsimile apparatuses, mobile terminals, smart phones, notebook PCs, tablet terminals, PDAs, digital cameras, music playback devices, televisions, or the like may be applied. Also, a multifunction peripheral (MFP: Multifunction Peripheral) having a plurality of functions such as a copy function, a FAX function, a print function or the like may be applied.

Firstly, the information processing apparatus 101, and configurations of the information processing apparatus 101 and the communication apparatus 151 are described with reference to the block diagram of FIG. 1. Also, the following configurations are described as examples in the present embodiment, but limitation is not made to the configurations illustrated in FIG. 1, and blocks according to functions that the information processing apparatus 101 and the communication apparatus 151 can respectively execute may also be included as appropriate.

The information processing apparatus 101 includes an input interface 102, a CPU 103, a ROM 104, a RAM 105, an external storage apparatus 106, an output interface 107, a display unit 108, a communication unit 109, and a short distance wireless communication unit 110. Note that, these are connected to each other via a system bus. The input interface 102 is an interface for receiving data input from a user and execution instructions of functions, and is an interface for receiving data input from the user and operation instructions via an operation unit (not shown) such as a keyboard, buttons, or a touch panel. Note that the later described display unit 108 and an operation unit may be at least partially integrated, and, for example, may be of a configuration such that screen output and reception of operations from a user are performed on the same screen.

The CPU 103 is a system control unit and comprehensively controls the information processing apparatus 101 overall. Also, it performs display control of the display unit 108 of the information processing apparatus 101, for example. The ROM 104 stores fixed data such as data tables and control programs and an embedded operating system (OS) program that the CPU 103 executes. In the present embodiment, each control program stored in the ROM 104, for example, under management of the embedded OS stored in the ROM 104, performs software execution control such as scheduling, task switching, and interrupt processing.

The RAM 105 is configured by an SRAM (Static Random Access Memory) that requires a backup power supply, a DRAM, or the like. Note that the RAM 105 may hold data by a primary battery for data backup (not shown). In such a case, the RAM 105 can store important data such as program control variables in a non-volatile manner. Also, a memory area for storing settings information of the information processing apparatus 101, management data of the information processing apparatus 101, and the like is also provided in the RAM 105. Also, the RAM 105 is used as a work memory and a main memory of the CPU 103.

The external storage apparatus 106 stores an application which provides a print execution function, a print information generation program which generates print information that the communication apparatus 151 can interpret, and the like. Also, the external storage apparatus 106 stores various programs such as an information transmission/reception control program for transmission/reception with the communication apparatus 151 via the communication unit 109, and various information which these programs use.

The output interface 107 is an interface for performing control for the display unit 108 to display data and display state information of the information processing apparatus 101. The display unit 108 is configured with an LED (a light emitting diode) or an LCD (a liquid crystal display), and displays data and displays state information of the information processing apparatus 101. Note that, by positioning a software keyboard having keys such as numeric value input keys, a mode setting key, a decide key, a cancel key, and a power supply key on the display unit 108, input from the user via the display unit 108 may be received.

The communication unit 109 executes data communication with an external apparatus such as the communication apparatus 151. For example, the communication unit 109 connects to an access point (not shown) within the communication apparatus 151 and executes data communication with the communication apparatus 151. Note, configuration may be taken so that the communication unit 109 performs wireless communication with the communication apparatus 151 directly. Also, configuration may be taken so that wireless communication is mutually performed via an external access point, an access point 131 for example, that is present externally to the information processing apparatus 101 and the communication apparatus 151. Wi-Fi (Wireless Fidelity) (registered trademark) or Bluetooth (registered trademark) for example are wireless communication methods. Also, a device such as a wireless LAN router for example is used as the access point 131. Note, in the present embodiment, a method by which the information processing apparatus 101 and the communication apparatus 151 directly connect without going through the external access point 131 is called a direct connection method. Also, a method by which the information processing apparatus 101 and the communication apparatus 151 connect via the external access point 131 is called an infrastructure connection method.

The short distance wireless communication unit 110 is configured to wirelessly connect with the communication apparatus 151 or the like at a short distance and execute data communication, and performs communication by a communication method different from that of the communication unit 109. The short distance wireless communication unit 110 is capable of a wireless connection with a short distance wireless communication unit 157 within the communication apparatus 151. Note, in the present embodiment, Bluetooth Low Energy (BLE) whose communication range is shorter than the communication method of the communication unit 109 is used as the communication method of the short distance wireless communication unit 110. That is, the short distance wireless communication unit 110 has a BLE unit. The BLE unit includes a microcomputer which is a microprocessor for performing processing for wireless communication, and a wireless communication circuit which performs transmission/reception of data by wireless communication. Note, the microcomputer is equipped with a RAM and a flash memory. Note, as a communication method of the short distance wireless communication unit 110, NFC (Near Field Communication) or Wi-Fi Aware may be used for example.

The communication apparatus 151 includes a ROM 152, a RAM 153, a CPU 154, a print engine 155, a communication unit 156, the short distance wireless communication unit 157, and an operation unit 158. Note that, these are connected to each other via a system bus. There also are cases in which the communication unit 156 includes an access point for connecting with an apparatus such as the information processing apparatus 101, as an access point inside the communication apparatus 151. Note, configuration may be taken so that the communication unit 156 performs wireless communication with the information processing apparatus 101 directly. Also, configuration may be taken so that the communication unit 156 performs mutual wireless communication with the information processing apparatus 101 via the access point 131. Wi-Fi or Bluetooth for example are wireless communication methods. Also, the communication unit 156 may be equipped with hardware for functioning as an access point, and the communication unit 156 may be configured to operate as the access point by software for causing it to function as the access point. The short distance wireless communication unit 157 is configured to wirelessly connect with the information processing apparatus 101 or the like at a short distance, and to execute data communication, and performs communication by a communication method different from that of the communication unit 156. The short distance wireless communication unit 157 is capable of a wireless connection with the short distance wireless communication unit 110 within the information processing apparatus 101. In the present embodiment, Bluetooth Low Energy (BLE) is used as the communication method of the short distance wireless communication unit 157. That is, the short distance wireless communication unit 157 has a BLE unit. The BLE unit includes a microcomputer which is a microprocessor for performing processing for wireless communication, and a wireless communication circuit which performs transmission/reception of data by wireless communication. Note, the microcomputer is equipped with a RAM and a flash memory. Note, NFC or Wi-Fi Aware for example, may be used as the communication method of the short distance wireless communication unit 157.

The RAM 153 is configured with an SRAM requiring a backup power supply, DRAM, or the like. Note that the RAM 153 may hold data by a primary battery for data backup (not shown). In such a case, the RAM 153 can store important data such as program control variables in a non-volatile manner. Also, a memory area for storing settings information of the communication apparatus 151, management data of the communication apparatus 151, and the like is also provided in the RAM 153. Also, the RAM 153 is used as the work memory and the main memory of the CPU 154, stores various information, and functions as a reception buffer for temporary storage of print information received from the information processing apparatus 101 or the like.

The ROM 152 stores fixed data such as data tables and control programs and an OS program that the CPU 154 executes. In the present embodiment, each control program stored in the ROM 152 performs software execution control of scheduling, task switching, interrupt processing, and the like under the management of an embedded OS stored in the ROM 152.

The CPU 154 comprehensively controls the whole system of the communication apparatus 151. For example, by controlling the print engine 155 based on a print job received from the information processing apparatus 101 or the like, information stored in the RAM 153, or the like, an image is formed onto a printing medium such as a sheet by using a print agent such as ink, and a print result is caused to be outputted. Since the transmission data quantity is large and high-speed communication is required for a print job that is to be transmitted from the information processing apparatus 101 or the like at this time, the communication apparatus 151 receives the print job via the communication unit 156 which can communicate at a higher speed than the short distance wireless communication unit 157. Also, display control of the communication apparatus 151 is performed, for example. Note, a memory such as an external HDD, an SD card, or the like may be attached to the communication apparatus 151 as an option unit, and configuration may also be taken such that the information stored in the communication apparatus 151 is stored in this memory.

The operation unit 158 includes a hardware key, an LED, and a liquid crystal panel, receives operation instructions from the user, and displays apparatus information, job information, and the like.

In the present embodiment, the information processing apparatus 101 operates as a master apparatus, and the communication apparatus 151 operates as a slave apparatus. Here, as one example, although the assignment of the processing of the information processing apparatus 101 and the communication apparatus 151 is described as above, there is no limitation to this assignment configuration in particular, and another assignment configuration may be used.

Next, with reference to FIG. 2, description is given of processing for transmitting advertising information in a BLE standard and receiving a request to start of a GATT (Generic Attribute Profile) communication, which is performed between the information processing apparatus 101 and the communication apparatus 151. In the present embodiment, the short distance wireless communication unit 157 of the communication apparatus 151 operates as a slave device, and it is assumed that the short distance wireless communication unit 157 performs the above described processing.

The short distance wireless communication unit 157 performs communication by dividing a frequency band of 2.4 GHz into 40 channels (0 through 39) in BLE communication. The short distance wireless communication unit 157 uses the 37th to 39th channels out of the 40 channels for transmission of the advertising information and reception of the start request for a BLE connection, and uses the 0th to 36th channels for the data communication after the BLE connection. In FIG. 2, the ordinate illustrates power consumption of the short distance wireless communication unit 157, the abscissa illustrates time, and the power consumption when the advertising information is transmitted using one channel is illustrated for each process.

Tx 205 illustrates total power consumption in processing for broadcasting the advertising information (hereinafter referred to as transmission processing). Rx 206 illustrates total power consumption in processing (hereinafter referred to as reception processing) for enabling a receiver for receiving a start request for a BLE connection. A transmission power 202 illustrates an instantaneous power consumption due to transmission processing. A received power 203 illustrates an instantaneous power consumption due to reception processing. Also, a microcomputer operating power 201 illustrates an instantaneous power consumption in a case when the microcomputer in the short distance wireless communication unit 157 is operating. Note that the microcomputer is operating before and after Tx 205 and Rx 206 because it is necessary for the microcomputer to be activated in advance in order to execute or stop transmission/reception processing. Also, in the case of performing a transmission of the advertising information on a plurality of channels, the power consumption increases by the number of channels over which the transmission of the advertising information is performed. While the microcomputer is not performing an operation and the short distance wireless communication unit 157 is in a power saving state, a sleep power 204 is the instantaneous power consumption of the short distance wireless communication unit 157. In this way, by, after performing transmission processing using a predetermined channel, performing the reception processing in a fixed interval using the same channel, the short distance wireless communication unit 157 waits for a transmission of a start request for a BLE connection from the information processing apparatus 101.

The short distance wireless communication unit 157, as illustrated in FIG. 3, after repeating the advertising information transmission processing and the reception processing for each channel of 37 through to 39 three times, causes operation of the microcomputer to stop and enters the power saving state for a fixed interval. Hereinafter, the combination of advertising information transmission processing and reception processing by a predetermined channel will be called advertising. Also, a time interval in which the advertising information is transmitted by predetermined channel, specifically the time interval from when advertising information is transmitted by a particular channel until when the next advertising information is transmitted by the same channel will be referred to as an advertising interval. Note, the number of times that advertising is repeated from when performing the first advertising until when the power saving state is entered may be optionally changed if it is three times or less.

Here, description is given regarding processing for presenting to a user functions for which execution is recommended based on a state of the communication apparatus 151 and a state of a predetermined application, in the predetermined application executed on the information processing apparatus 101.

The predetermined application is an application for performing a setting of an access point that is a connection destination of the communication apparatus 151, and for making a processing execution instruction to the communication apparatus 151. In the present embodiment, the predetermined application is described with an example of a printing application (hereinafter referred to as a print app) for causing the communication apparatus 151 to print image data, document data, or the like within the information processing apparatus 101. Note, the printing application may have functions other than the function to set the connection destination access point of the communication apparatus 151 and the print function. For example, the printing application may have a function for causing scanning of an original document which is set on an original platen (not shown) of the communication apparatus 151 in the case when the communication apparatus 151 has a scanning function. Also, the printing application may have a function for performing other setting of the communication apparatus 151, a function for confirming a state of the communication apparatus 151, a function for displaying an operation explanation of the communication apparatus 151 or the like.

Also, in the present embodiment, the printing application can obtain advertising information by detecting reception of the advertising information which is transmitted from the short distance wireless communication unit 157 of the communication apparatus 151 via the short distance wireless communication unit 110 of the information processing apparatus 101. Furthermore, the printing application can obtain state information which indicates the state of the communication apparatus 151, the setting content, or the like from the communication apparatus 151 by performing a GATT communication. Note, in a case when the advertising information includes the state information, if the advertising information is received, the obtainment of the state information is possible without performing the GATT communication.

Figure 4A:
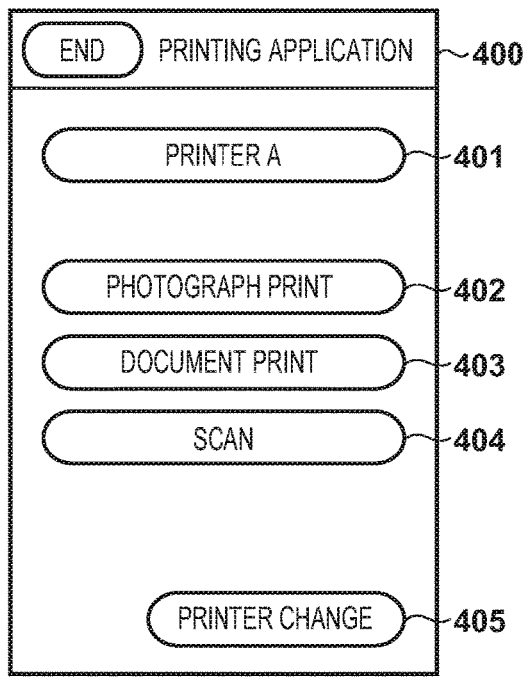
FIGS. 4A-4D are views illustrating screens that are displayed during an activation of a printing application.

FIGS. 4A-4D are views illustrating examples of display states of screens displayed on the display unit 108 during activation of the printing application. Specifically, FIGS. 4A-4D are screens that the printing application provides. FIG. 4A is an activation screen 400, and functions so that the communication apparatus 151 can execute such as a print of a photographic image, a print of a document, or a scan can be used thereby. In FIGS. 4A-4D, a printer button 401 that calls a function for displaying a printer information screen, a photograph print button 402 that calls a function for printing a photographic image, and a document print button 403 that calls a function for printing a document are illustrated. Also, in the activation screen 400 a scan button 404 that calls a scanning function and a printer change button 405 that calls a function for displaying a registered printer list screen 420 are illustrated.

Figure 4B:
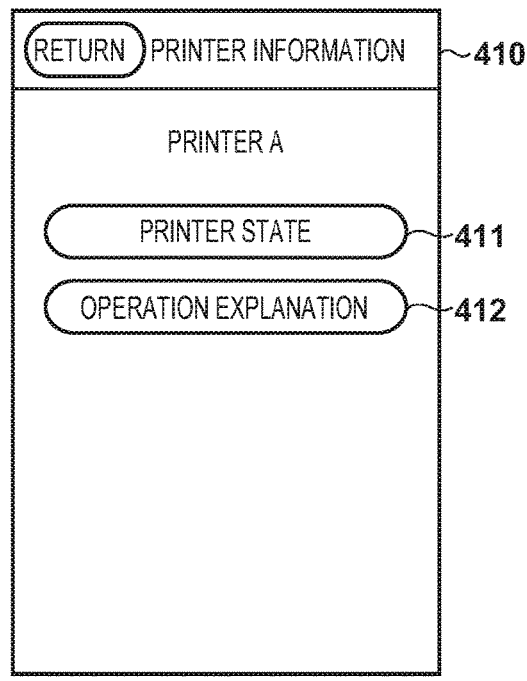

FIG. 4B is a printer information screen 410 that is displayed in the case when the printer button 401 of the activation screen 400 is tapped (pressed), and it can display a state of the communication apparatus 151 which is selected, and display an operation explanation for the communication apparatus 151. When a printer state button 411 is tapped, a Web page (hereinafter referred to as a Remote UI page), which presents a state of the printer such as a remaining amount of ink or an error state of the printer, which are stored in the RAM 153 of the communication apparatus 151, is displayed. Configuration may be taken such that the display of a Remote UI page is in the printing application, or such that an Internet browser is separately activated and it is displayed on the Internet browser. When an operation explanation button 412 is tapped, a function for displaying an explanation of the operation of the communication apparatus 151 is called. In the display of the operation explanation, the printing application may display operation explanation content stored in the external storage apparatus 106 or the like of the information processing apparatus 101. Also, the operation explanation content may be stored as a Web page on a predetermined server on the Internet, and the printing application may obtain this and then display it. The operation explanation content on the Web page may be displayed within the printing application or may be displayed on an Internet browser where the Internet browser is separately activated.

Figure 4C:
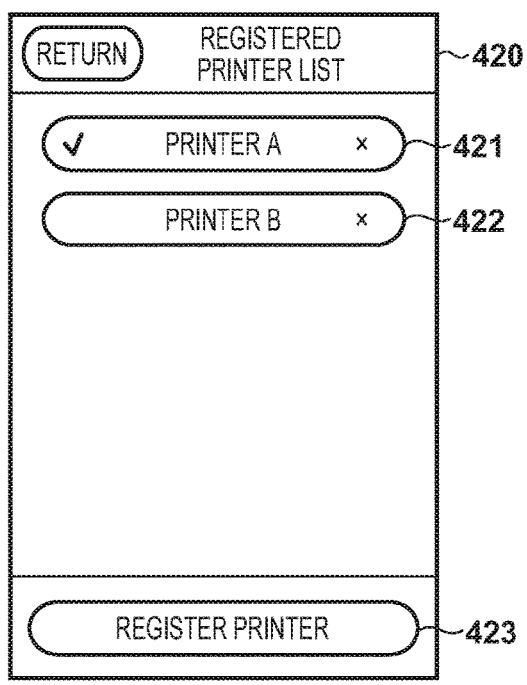

FIG. 4C is the registered printer list screen 420 that is displayed when the printer change button 405 of the activation screen 400 is tapped, and FIG. 4C displays a list of communication apparatuses 151 already registered to the printing application. In the present embodiment, it is possible to register a plurality of communication apparatuses 151 to the printing application and for a user to switch between these and use them as appropriate. In FIG. 4C, printer selection buttons (printer A-button 421 and printer B-button 422) are displayed, and it is possible to select a printer to cause to execute processing by selecting one of the printer selection buttons. In the example of FIG. 4C, it is indicated that the communication apparatus 151 that the user has currently selected is "printer A" by display of a check mark for "printer A" among the already registered printers. Also, a detected printer list screen 430 for executing a function of detecting a communication apparatus 151 other than the already registered communication apparatuses 151 and registering it is displayed when a printer registration button 423 is tapped.

Figure 4D:
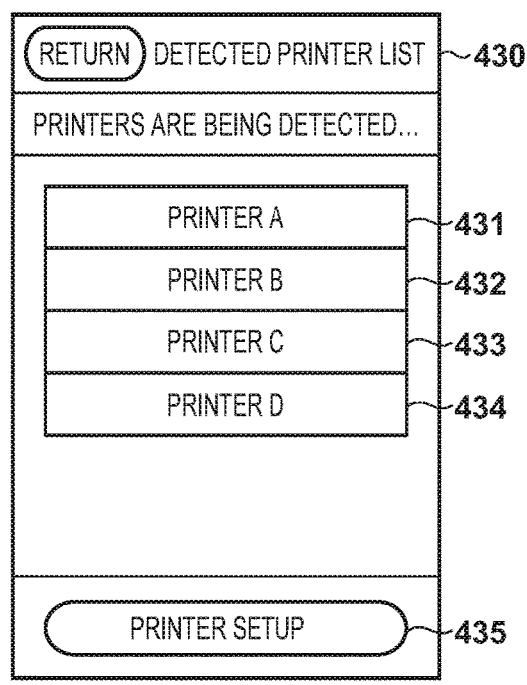

FIG. 4D is the detected printer list screen 430 that is displayed when the printer registration button 423 of the registered printer list screen 420 is tapped. When the detected printer list screen 430 is displayed in the printing application, the information processing apparatus 101 detects the communication apparatuses 151 connected via the access point 131 and sequentially displays them in a detected printer list. Note that already registered communication apparatuses are also detected at this time. In FIG. 4D, it is indicated that a total of four of the communication apparatus 151 have been detected (a printer 431, a printer 432, a printer 433, and a printer 434). When a printer from the list which is desired to be registered is tapped by the user, it is registered as a communication apparatus 151 which can be selected in the printing application, and is added to the list of the previously described registered printer list screen 420. At that time, an identifier such as the MAC addresses of the communication apparatuses 151 is used to manage each communication apparatuses 151 registered to the printing application.

When a communication apparatus 151 is registered to the printing application, the information processing apparatus 101 obtains from the communication apparatus 151 information (Capability information) for functions that the communication apparatus 151 has via the communication unit 156 of the registered communication apparatus 151. Then, the information processing apparatus 101 associates the obtained Capability information with the MAC address or the like which identifies the registered communication apparatus 151 and holds it. In the Capability information, a list of functions that the communication apparatus 151 has (such as a print function, a scanning function, a copy function, and a Remote UI function) and settable values for the respective functions, and the like are included. For example, in the case of a print function, there is information such as a list of setting values of paper type and paper size that can be printed, an existence or absence of a color print or a monochrome print, and an existence or absence of a double-sided print. Note that if the Capability information is included in the advertising information transmitted from the BLE communication unit that the communication apparatus 151 has, it can be obtained by receiving the advertising information. Also, it can be obtained by performing a GATT communication by the BLE communication unit.

Also, it is possible to perform a setting of a connection destination access point of an undetected communication apparatus 151 when a printer setup button 435 is tapped. It is possible to set an access point that the information processing apparatus 101 is connected to from the communication apparatus 151 by sending access point connection information from the information processing apparatus 101 to the communication apparatus 151 by a GATT communication. By setting the access point that the information processing apparatus 101 is connected to as a connection destination for an undetected communication apparatus 151, the communication apparatus 151 that was undetected will become detected in the printing application when the detected printer list screen 430 previously described is displayed. Also, a communication apparatus 151 can become detected from the printing application by performing a setting of the communication apparatus 151 connection destination access point. Also, it becomes possible to use a function that the communication apparatus 151 has from the printing application by the user selecting the printer from the registered printer list screen 420. The printing application receives state information of the communication apparatus 151 or the like by receiving advertising information transmitted from the short distance wireless communication unit 157 of the communication apparatus 151, and by performing a GATT communication as necessary.

Description is given here for a method by which the information processing apparatus 101 and the communication apparatus 151 perform a network connection by a BLE communication scheme. In the following description, the communication apparatus 151 is assumed to be an advertiser that transmits advertising information in predetermined intervals. Also, the information processing apparatus 101 is assumed to be a scanner that awaits advertising information transmitted from an advertiser in the periphery. Note that the following processing is executed in a case when a BLE connection is disconnected after pairing process completes.

Firstly, the short distance wireless communication unit 157 performs transmission of advertising information. The information processing apparatus 101 can recognize the existence of the communication apparatus 151 by receiving the advertising information that the short distance wireless communication unit 110 transmitted from the short distance wireless communication unit 157.

If the information processing apparatus 101 recognizes the communication apparatus 151 and decides to connect to the communication apparatus 151, it transmits connection request information to the communication apparatus 151. Specifically, the short distance wireless communication unit 110 transmits CONNECT_REQ which is a request for transitioning to a connection event in which a network connection by BLE is established. When the short distance wireless communication unit 157 receives CONNECT_REQ, the information processing apparatus 101 and the communication apparatus 151 prepare to transition to a connection event. Specifically, short distance wireless communication unit 110 and the short distance wireless communication unit 157 make notifications to the CPU 103 and the CPU 154 respectively that preparations for transitioning to a BLE connection event have completed. After that, the information processing apparatus 101 and the communication apparatus 151 respectively transition from the scanner and the advertiser to the master and the slave, and the information processing apparatus 101, which is the master, and the communication apparatus 151, which is the slave, establish a BLE connection. Note that in the BLE standard, the master can form a "1: many" star topology with the slave. The information processing apparatus 101 and the communication apparatus 151 can perform data communication by the GATT communication scheme after a BLE connection is established.

Here, description is given regarding details of a pairing process executed at a time of the BLE communication in the present embodiment. Firstly, the information processing apparatus 101 starts a search for advertising information including particular apparatus information in the case when a later described print app is activated, and an initial screen (a home screen) which is displayed by the print app is displayed on the display unit 108. Note, the specific apparatus information is a UUID, a MAC address, or the like of an apparatus (such as a printer) corresponding to the print app for example. Also, the information processing apparatus 101, when advertising information that includes specific apparatus information is received, transmits a BLE connection request (CONNECT_REQ) to the apparatus that transmitted the advertising information (the communication apparatus 151 here) and establishes a BLE connection between the apparatuses. Then, the information processing apparatus 101 displays on the display unit 108 a screen for prompting a pairing to the user in a case when a pairing with the communication apparatus 151 has not been completed. Then, the information processing apparatus 101 transmits to the communication apparatus 151 a pairing request by communication by a security manager protocol in a case when an execution of a pairing is instructed to a user. Note that, until the pairing ends, the communication between apparatuses is assumed to be performed by the security manager protocol. The communication apparatus 151 displays a PIN code display screen 1200 as illustrated in FIG. 12A to the display unit when a pairing request is received. A PIN code 1201 and a Cancel button 1202 for cancelling a pairing process are displayed on the PIN code display screen 1200.

Then, the information processing apparatus 101 displays a PIN code input screen 1210 as illustrated in FIG. 12B to the display unit 108 when a pairing request is transmitted. A PIN code input area 1211 for receiving an input of the PIN code 1201 by the user is displayed on the PIN code input screen 1210. Also, an OK button 1213 for transmitting the inputted PIN code 1201 to the communication apparatus 151 and the Cancel button 1212 for cancelling the pairing process are displayed on the PIN code input screen 1210. The information processing apparatus 101 transmits information including the inputted PIN code 1201 to the communication apparatus 151 when the OK button 1213 is pressed in a state in which the PIN code 1201 is inputted to the PIN code input area 1211. The communication apparatus 151 determines whether or not the PIN code 1201 that includes the received information matches the PIN code 1201 that is displayed on the PIN code display screen 1200 and permits a pairing to the information processing apparatus 101 in a case when it determines that they match. Specifically, the communication apparatus 151 exchanges a link key generated by a predetermined method based on the PIN code 1201 with the information processing apparatus 101 by using an SMP (Security Manager Protocol) of the BLE standard. The exchanged link key is stored to the held storage area of the information processing apparatus 101 (such as the ROM 104) and the held storage area of the communication apparatus 151 (such as the ROM 152) respectively. By this, the pairing completes and execution of BLE communication with the apparatus hereinafter is permitted. Note, the information processing apparatus 101 hides the PIN code display screen 1200 and again displays the original screen when the pairing completes.

After completion of the pairing, the information processing apparatus 101 makes a notification to the communication apparatus 151 that the link key is stored in the storage area at a time of the pairing process when transmitting a GATT communication request to the communication apparatus 151. The communication apparatus 151, in a case when the GATT communication request is received, compares the notified link key and the link key stored in the storage area at a time of the pairing process and confirms whether the apparatus that is transmitting the GATT communication request is a paired apparatus. Then, the communication apparatus 151 starts reading/writing of information by the GATT communication with the information processing apparatus 101 in a case when it can be confirmed that it is a paired apparatus. By this, if the information processing apparatus 101 first completes the pairing process with the communication apparatus 151, it can then execute GATT communication with the communication apparatus 151 without an input of a PIN code by a user hereinafter. Note, in the description above, although a configuration to allow a user to input the PIN code 1201 being displayed on the PIN code input screen 1210 to the PIN code input area 1211 is described, the configuration is not limited to this. For example, a configuration in which the PIN code 1201 is notified to the communication apparatus 151 without a user input may be taken by taking a configuration in which the PIN code 1201 is made to be fixed (the user cannot change it arbitrarily) information, and is stored in the information processing apparatus 101 together with the installation of the print app. Also, the timing at which the pairing process is started being is not limited to the above configuration, it may be a timing at which a user instructs a print via a print app, a timing prior to a timing at which the BLE connection is performed in connection setting processing, or the like, for example.

Figure 5:
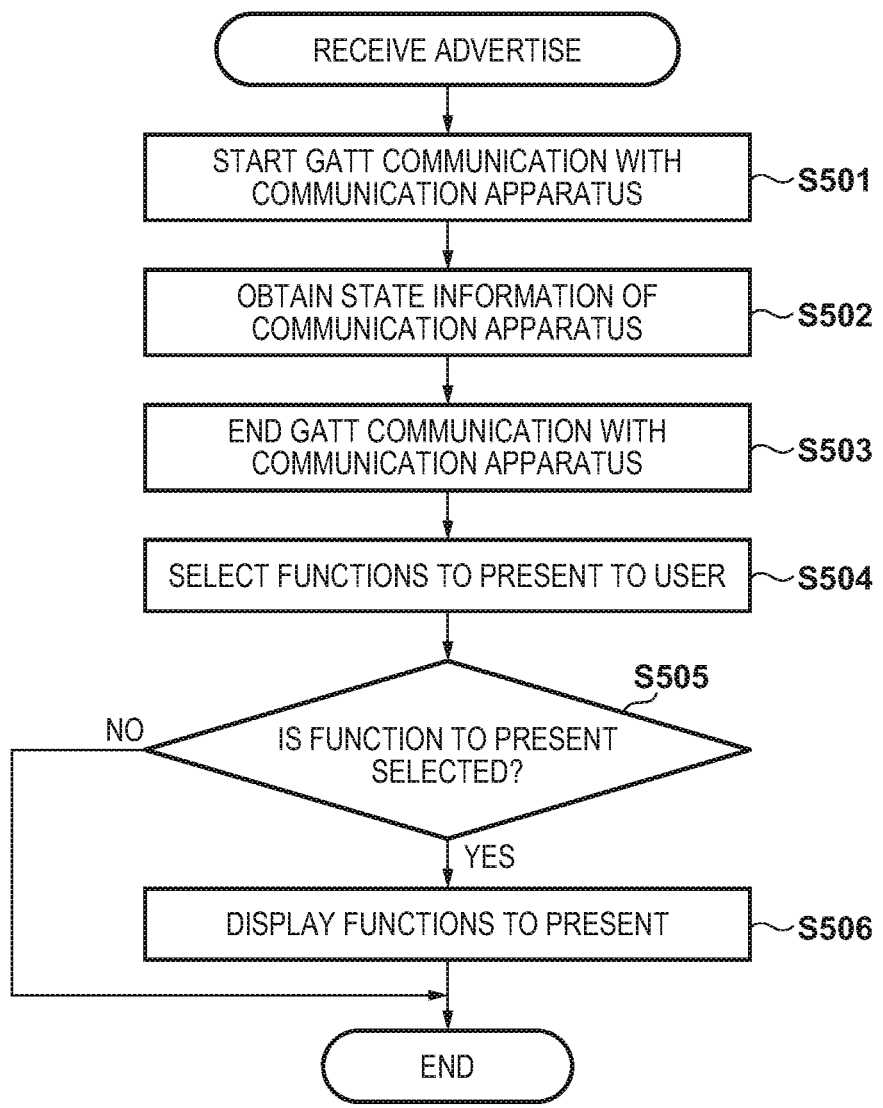
FIG. 5 is a flowchart illustrating processing that presents functions for which execution is recommended to a user.

FIG. 5 is a flowchart illustrating processing for presenting functions for which execution is recommended based on a state of the communication apparatus 151 and a state of a predetermined application when the information processing apparatus 101 detects a reception of advertising information transmitted from the communication apparatus 151. In other words, FIG. 5 is a flowchart illustrating processing for presenting a dialog (a guidance screen) for guidance for execution of a recommended function. The flowchart illustrated in FIG. 5 is realized by, for example, the CPU 103 reading a program that is stored in the ROM 104, the external storage apparatus 106 or the like into the RAM 105, and executing the program.

Firstly, in step S501, the CPU 103 starts a GATT communication with the communication apparatus 151 that transmitted the received advertising information by the foregoing method. Next, in step S502, the CPU 103 obtains state information indicating a state of the communication apparatus 151, setting content, or the like by a GATT communication, and then ends the GATT communication with the communication apparatus 151 in step S503. Here, the state information of the communication apparatus 151 obtained in step S502 includes the following information, for example.

Model Name
MAC Address
Sales Region Information
Screen ID
Connection Destination Access Point Information Model Name is a model name of the communication apparatus 151 and MAC address is a MAC address of the communication apparatus 151. Sales Region Information indicates information regarding a sales region. Also, Screen ID is an ID for identifying display contents of a display unit (not shown) of the communication apparatus 151. In the case when each function, such as a network setting function or a copy function of the communication apparatus 151, is selected, an ID is assigned to each of the details displayed to the display unit of the communication apparatus 151. The connection destination access point information is information indicating whether the connection destination access point of the communication apparatus 151 is already set or not yet set. Configuration may be taken so as to include information such as an SSID (Service Set Identifier) of the connection destination access point if already set.

Next, in step S504, selection of functions to present on the printing application is made based on the setting state of the printing application and the state information of the communication apparatus 151. Note that the processing in step S504 is described later. Next in step S505 the CPU 103 determines whether or not a function to be presented is selected in step S504. Here, in the case when functions are determined to be selected, the CPU 103 in step S506 presents to a user the selected functions, and in a case when none are determined be selected, the CPU 103 ends the processing of FIG. 5. Here, configuration is such that the selected functions are presented to the user in step S506, but configuration may be taken so as to execute the selected function in a case when, for example, a selected function is uniquely finalized.

Here, in the present embodiment, advertising information is received when the printing application is activated. Accordingly, while in FIG. 5, execution is at a timing at which the advertising information is received when the printing application is activated, there is no limitation to this. For example, configuration may be taken so as to cause the printing application to activate and then execute the processing illustrated in FIG. 5, in a case when the information processing apparatus 101 receives advertising information.

Figure 6:
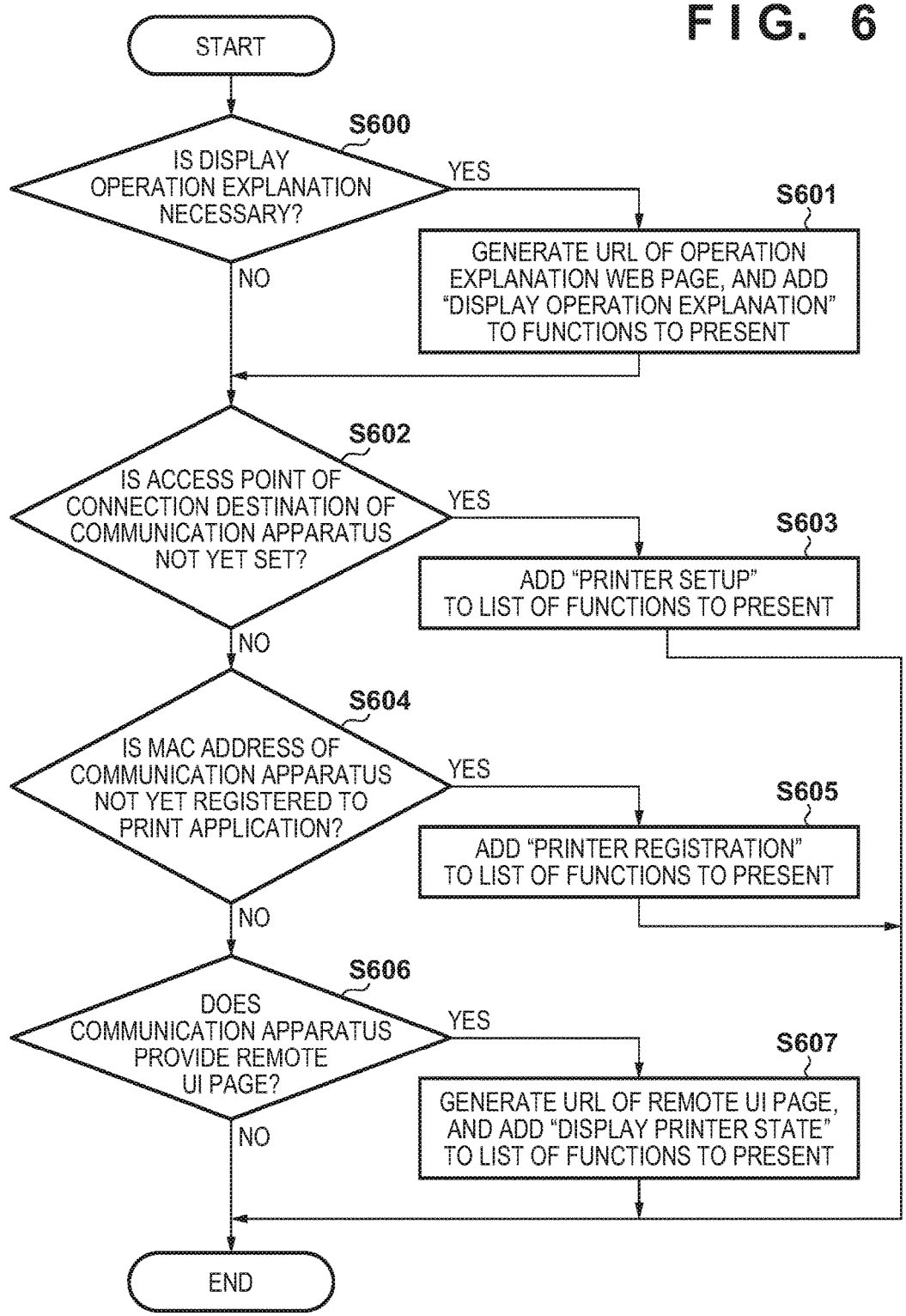
FIG. 6 is a flowchart illustrating processing for selecting presented functions.

FIG. 6 is a flowchart illustrating processing of, in step S504, selecting functions to present on the printing application based on the setting state of the printing application and the state information of the communication apparatus 151. Firstly, in step S600, it is determined whether or not an operation explanation display is necessary for the content displayed on the display unit of the communication apparatus 151 based on the screen ID obtained from the communication apparatus 151. That is, it is determined whether or not it is a screen requiring operation explanation display based on the screen ID. For example, it is determined that an operation explanation display is necessary in a case when there are many menu alternatives and there is a long operation procedure. In such a case, usability is improved by presenting to the user the operation procedure in a Web page. As a concrete example, it is determined that an operation explanation display is necessary in a case when, for example, a copy execution screen or a maintenance screen is being displayed in the display unit of the communication apparatus 151. In a case when it is determined that the operation explanation display is necessary, the processing proceeds to step S601. Meanwhile, in a case when it is determined that an operation explanation display is unnecessary in step S600, the processing proceeds to step S602.

Figures 7, 8:
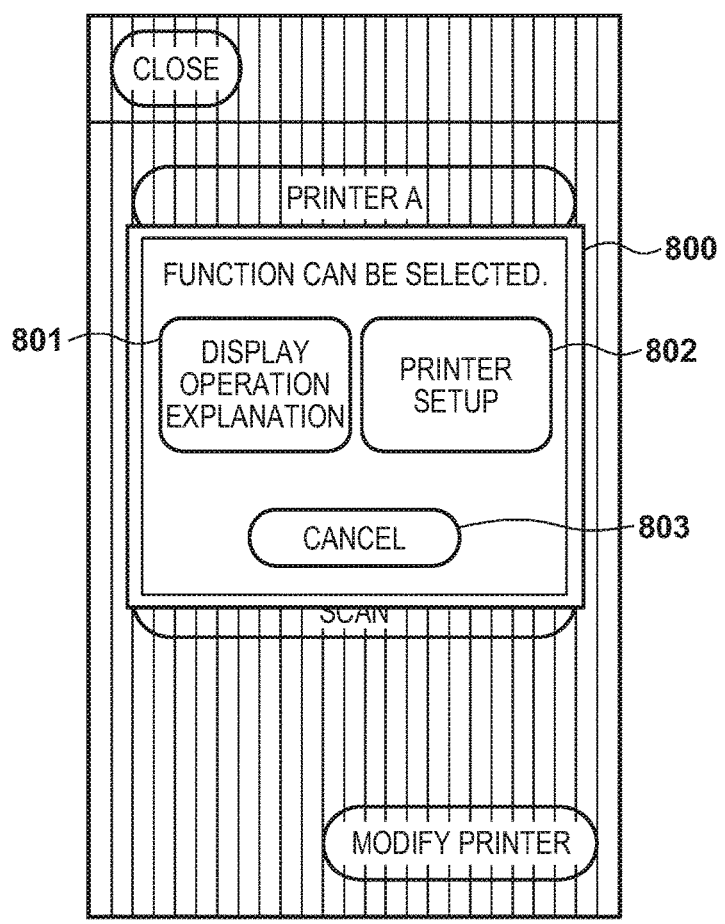
FIG. 7 is a view illustrating a configuration of a URL of a Web page for operation explanation.
FIG. 8 is a view illustrating a display screen for after function selection.

In step S601, the CPU 103 generates a URL for an operation explanation Web page based on a server address at which the content is stored, an identifier for displaying a page corresponding to the screen ID, and a model name and sales region information obtained from the communication apparatus 151. FIG. 7 is a view illustrating an example of a configuration of a URL of a Web page for operation explanation. Normally, the operation method differs for each model for the communication apparatus 151. Accordingly, configuration is such that the URL includes an identifier indicating the model name as a parameter, and it is possible to switch the displayed content by the model name. Also, there are cases in which functions and operation methods differ depending on the sales region, and therefore the URL is made to include an identifier indicating the sales region as a parameter. Furthermore, the URL includes an identifier indicating the screen ID as a parameter. It is possible to distinguish which function of the communication apparatus 151 was selected for the user to operate the communication apparatus 151 by the identifier indicating the screen ID. By displaying in an Internet browser or the like the Web page URL for operation explanation generated in this way, it is possible to present an operation explanation of the communication apparatus 151 that the user is attempting to operate. In step S601, the CPU 103 causes the RAM 105 to hold the URL of the Web page for the operation explanation generated in this way, and adds a "operation explanation display" function to the list of functions presented to the user, and the processing proceeds to step S602.

In step S602, the CPU 103 determines whether or not to present to the user a "printer setup" function of the printing application based on the connection destination access point information obtained from the communication apparatus 151. Specifically, it determines whether the connection destination access point of the communication apparatus 151 is not yet set. In step S602, in a case when the connection destination access point information obtained from the communication apparatus 151 indicates "already set", the processing proceeds to step S604 without adding "printer setup" to the presented function list. This is because, in such a case, it is not necessary to prompt the user to set the access point of the connection destination of the communication apparatus 151. Meanwhile, in the case when the connection destination access point information obtained from the communication apparatus 151 indicates "not yet set", the processing proceeds to step S603, the "printer setup" function of the printing application is added to the list of functions presented to the user, and the processing of FIG. 6 ends. In this way, in the case when the connection destination access point information obtained from the communication apparatus 151 represents "not yet set", the communication apparatus 151 is made to be detectable by the printing application by prompting the user for settings of the communication apparatus 151 connection destination access point.

In step S604, the CPU 103 determines whether or not the MAC address obtained from the communication apparatus 151 is not yet registered to the printing application. This determination is performed based on whether or not the MAC address obtained from the communication apparatus 151 exists within the communication apparatuses 151 registered to the printing application. The processing proceeds to step S606 in a case when it is determined to be registered, and the processing proceeds to step S605 to in a case when it is determined to be not yet registered. In a case when it is determined to be not yet registered in step S604, a "printer registration" function of the printing application is added to the list of functions presented to the user in step S605 and then the processing of FIG. 6 ends. In this way, the communication apparatus 151 can be used by the printing application by prompting for a detection of the communication apparatus 151 connected via the access point 131 to the user.

When the processing proceeds to step S606, the communication apparatus 151 is already registered to the printing application by the determination result of step S604. In step S606, the CPU 103 determines whether or not a Remote UI function is provided based on Capability information of the already registered communication apparatus 151 corresponding to the MAC address obtained from the communication apparatus 151. In a case when it is determined that the Remote UI function is not provided, the processing of FIG. 6 ends. Meanwhile, the processing proceeds to step S607 in a case when it is determined that the Remote UI function is provided.

In step S607, the CPU 103 generates a URL for displaying the Remote UI page and adds a "display printer state" function to the presented function list. The URL of the Remote UI page is configured from the IP address of the communication apparatus 151. Accordingly, in step S607, the CPU 103 specifies the IP address of the communication apparatus 151 transmitting the advertising information that the printing application received.

Firstly, the printing application transmits a broadcast by Wi-Fi for example, on a network connecting via the access point 131 from the communication unit 109 of the information processing apparatus 101. Then, it detects the IP address of the communication apparatus 151 connected on the network. Next, the CPU 103 obtains the MAC address from the communication apparatus 151 of the communication apparatus 151 corresponding to the detected IP address and determines whether or not it matches with the MAC address obtained from the communication apparatus 151 which transmitted the advertising information. In a case when the MAC addresses match, the IP address of the communication apparatus 151 transmitting the advertising information can be specified. In this way, the CPU 103 specifies the IP address of the communication apparatus 151 transmitting the advertising information that the printing application received and generates the URL of the Remote UI page based on the specified IP address. The URL of the Remote UI page is "https://192.168.11.10/" when the IP address of the communication apparatus is 192.168.11.10, for example. Then, the CPU 103 causes the RAM 105 to store the generated URL of the Remote UI page, adds the "display printer state" function to presented function list, and ends the processing of FIG. 6.

In the flowchart of FIG. 6, a priority order is provided to the functions presented on the display screen. For example, printer registration and printer state are not added in a case when printer setup is added to the presented function list. Also, printer state is not added in a case when printer registration is added to the presented function list. In this way, it is possible to reduce the number of functions presented by the presentation function selection dialog as illustrated in FIG. 8 by deciding the priority order. Note that the flowchart of FIG. 6 is something that describes processing of selecting functions to present on the printing application based on the setting state of the printing application and the state information of the communication apparatus 151, but the functions that are selected, the determination conditions, and the like are not limited to the content of FIG. 6. For example, configuration may be taken so that two or more of those among printer setup, printer registration, and printer state can be added. Also, the priority order of these may be changed.

FIG. 8 is a view illustrating one example of a display of a setting screen of a case when the CPU 103 selects an "operation explanation display" function and the "printer setup" function in step S506. Also, in terms of processing of the flowchart illustrated in FIG. 6, it illustrates the case in which Yes is determined in step S600 and Yes is determined in step S602. In FIG. 8, a situation in which a presentation function selection dialog 800 is displayed while the activation screen 400 of the printing application illustrated in FIG. 4A is displayed is illustrated. Note, a timing at which the presentation function selection dialog 800 is displayed may be during display of any of the screens of FIG. 4A through FIG. 4D for example and it is sufficient if it is a screen that is displayed while the printing application is activated, rather than it being limited to during display of the activation screen 400.

The CPU 103 separately activates the Internet browser and displays the Web page that is based on the URL of the operation explanation Web page generated in step S601 to the Internet browser when an "operation explanation display" button 801 on the presentation function selection dialog 800 is tapped. Regarding the contents displayed here, detailed explanation information relating to the network setting method is displayed in a case when a screen relating to the network is displayed to the operation panel of the communication apparatus 151. Also, for example, detailed explanation information relating to a copy function is displayed in a case when the copy screen is displayed. Note, the display form of the operation explanation is not limited to this as previously described. Also, the CPU 103 performs a setting of a connection destination access point of the communication apparatus 151 when a printer setup button 802 is tapped similarly to the case when the "printer setup" button 435 of the detected printer list screen 430 is tapped. Also, the CPU 103 closes the presentation function selection dialog 800 and returns to the state in which the activation screen 400 of the printing application is displayed when a cancel button 803 is tapped.

In this way, in the present embodiment, a presentation is made by the printing application of functions for which it is determined that execution is to be recommended to a user based on the state of the communication apparatus 151 and the setting state of the printing application. By this configuration, it is possible to omit operations and effort in searching for each function of the printing application that a user has a high probability of executing and so it is possible to improve the convenience of the user.

Note that, in the present embodiment, configuration is take to present the presentation function selection dialog 800 which selects functions for which it is determined that execution is to be recommended to a user based on the state of the communication apparatus 151 and the setting state of the printing application, but limitation is not made to this configuration. For example, configuration may be taken in which, in a case when there is only one function whose execution is determined to be recommended to a user, the selected function is executed after displaying for a fixed interval an explanation of the function to be executed, or the like, without displaying the presentation function selection dialog 800. By this configuration, it is possible to further omit user operation and further improve convenience.

Also, configuration may be taken so as to include information for deciding whether or not functions are presented in the printing application in the state information of the communication apparatus 151 obtained by GATT communication. For example, configuration may be taken so that an "application guide button" or the like to be pressed when a user desires to present functions in the printing application is provided to the communication apparatus 151. Configuration is taken so that in a case when the "application guide button" is pressed by the user, the functions to be presented in the printing application are included in the state information of the communication apparatus 151 as information for enabling the functions themselves. By this configuration, it becomes possible to present functions whose execution is determined to be recommended to the user in the printing application only in a case when it is determined that the user desires to actively perform operation guidance in the printing application. Specifically, it becomes possible to present a dialogue which guides to functions for which execution is recommended to the user.

Second Embodiment

In the first embodiment, description is given regarding a configuration in which functions whose execution is determined to be recommended to a user are presented in the printing application based on the state of the communication apparatus 151 obtained by GATT communication and the setting state of the printing application.

In contrast to this, in the present embodiment, description is given regarding a configuration in which the state information of the communication apparatus 151 is included in the advertising information that the communication apparatus 151 transmits. By this, it is possible to omit performing GATT communication in a case when a function in the printing application need not be presented.

Figure 9:
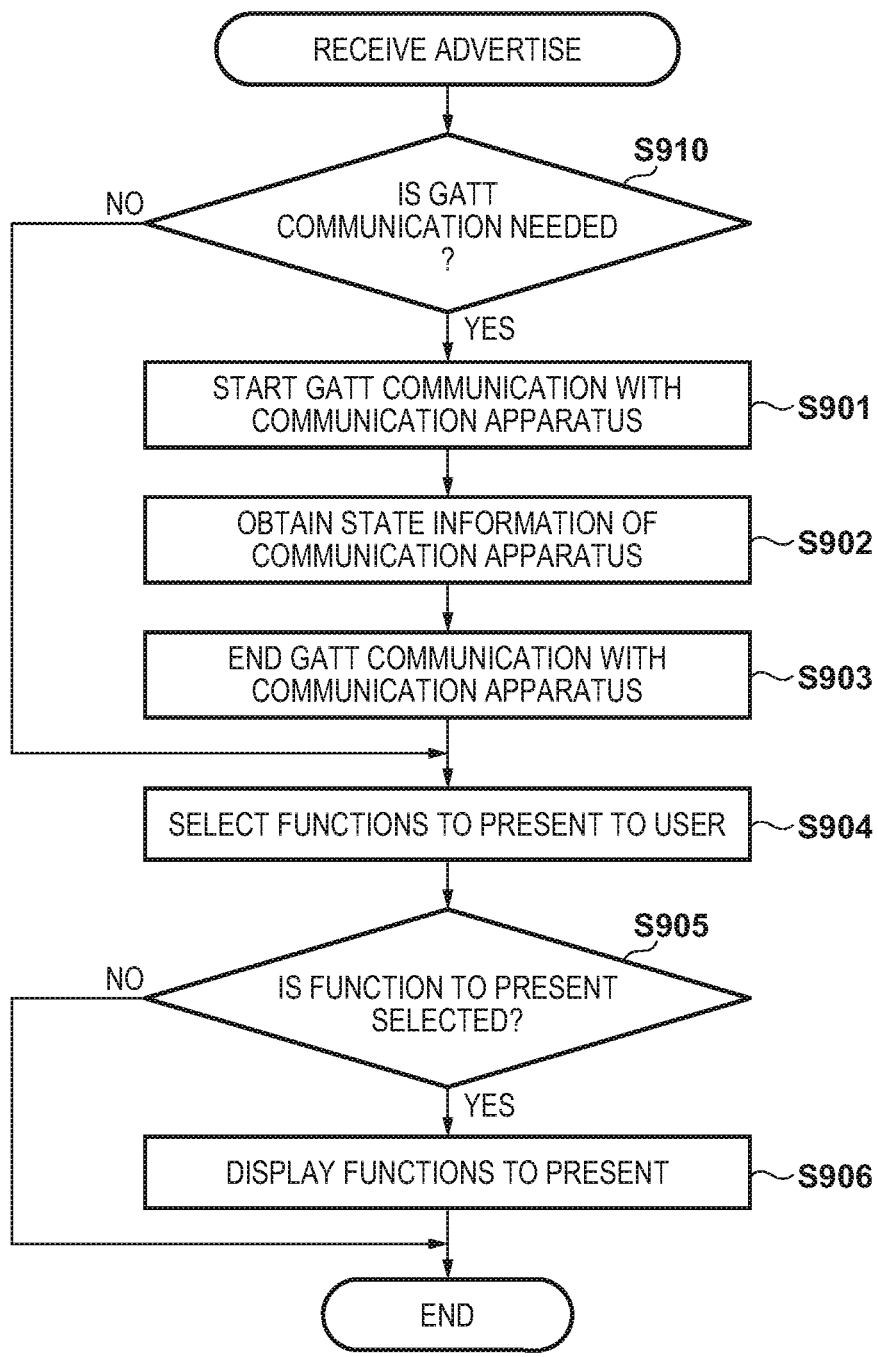
FIG. 9 is a flowchart illustrating processing that presents functions for which execution is recommended to a user.

FIG. 9 is a flowchart illustrating processing for presenting functions for which execution is recommended to the user based on a state of the communication apparatus 151 and a state of a predetermined application when the printing application detects a reception of advertising information transmitted from the communication apparatus 151. The flowchart illustrated in FIG. 9 is realized by, for example, the CPU 103 reading a program that is stored in the ROM 104, the external storage apparatus 106 or the like into the RAM 105, and executing the program. The processing of step S901 through step S906 is the same as the processing of step S501 through step S506, and therefore description thereof is omitted.

In step S910, the CPU 103 determines whether or not (necessary or not) obtainment of state information of the communication apparatus 151 by a GATT communication is necessary based on state information of the communication apparatus 151 included in advertising information that the communication apparatus 151 transmitted. In the present embodiment, although it is not illustrated, an "application guide button" or the like that can be pressed in the case when the user desires to present functions in the printing application is arranged on the communication apparatus 151. Also, the function for presenting functions in the printing application is enabled in a case when the "application guide button" is pressed by the user. Also, the function for presenting functions in the printing application is disabled in a case when it is not pressed. Information for enabling or disabling these is included in the state information of the communication apparatus 151 of the advertising information.

In step S910, GATT communication is determined to be necessary in a case when the function for presenting functions in the printing application is set to be enabled in the state information of the communication apparatus 151 included in the advertising information, and the processing proceeds to step S901. On the other hand, GATT communication is determined to be unnecessary in a case when the function for presenting functions in the printing application is set to be disabled in the state information of the communication apparatus 151 included in the advertising information, and the processing proceeds to step S904. Note that the processing of step S901 through step S906 is the same as the processing of step S501 through step S506, and therefore description thereof is omitted.

In this way, in the present embodiment, description is given regarding a configuration in which the state information of the communication apparatus 151 is included in the advertising information that the communication apparatus 151 transmits. Also, whether or not GATT communication is necessary is determined prior to performing the GATT communication, based on the state information of the communication apparatus 151 included in the advertising information. By such a configuration, it is possible to omit performing GATT communication in a case when a function need not be presented in the printing application. For this reason, in a case when the user is not actively attempting to perform operation guidance in the print app, it is not necessary to perform unnecessary GATT communication and it is possible to suppress power consumption of the short distance wireless communication unit 157 of the communication apparatus 151.

Note, although description is given regarding information as to whether the function for presenting functions in the printing application is enabled or disabled being set as state information of the communication apparatus 151 included in advertising information that the communication apparatus 151 transmits, limitation is not made to this. For example, configuration may be taken so to include information as to whether or not connection destination access point information is not yet set in the advertising information and to select a presentation of "printer setup" in step S904 in a case when the connection destination access point information is not yet set in the advertising information. Specifically, configuration may be taken so that the state information of the communication apparatus 151 included in the advertising information is added to the determination condition for selecting a function to present to a user in step S904. By this configuration, it becomes possible to shorten the time until a function is presented to a user and to present a function whose execution is determined to be recommended to the user in the printing application without performing a GATT communication. As a consequence, it is possible to present a dialogue which guides to a function for which execution is recommended to the user and to further improve the convenience of the user.

Third Embodiment

In the first embodiment, description is given regarding a configuration in which functions whose execution is determined to be recommended to a user are presented in the printing application based on the state of the communication apparatus 151 obtained by GATT communication and the setting state of the printing application. In contrast to this, in the present embodiment, description is given regarding a configuration in which the state information of the communication apparatus 151 is included in the advertising information that the communication apparatus 151 transmits. By this, it is possible to present a function whose execution is determined to be recommended in the printing application based on the setting state of the printing application without performing GATT communication.

Firstly, the information processing apparatus 101 receives the advertising information transmitted from the communication apparatus 151. The advertising information is assumed to include state information indicating the setting content, the state, or the like of the communication apparatus 151. The state information of the communication apparatus 151 included in the advertising information includes the following information, for example.

Model Name
MAC Address
Screen ID

Model Name is a model name of the communication apparatus 151 and MAC address is a MAC address of the communication apparatus 151. Also, Screen ID is an ID for identifying display contents of a display unit (not shown) of the communication apparatus 151. In the case when each function, such as a network setting function or a copy function of the communication apparatus 151, is selected, an ID is assigned to each of the details displayed to the display unit of the communication apparatus 151. The connection destination access point information is information indicating whether the connection destination access point of the communication apparatus 151 is already set or not yet set. Configuration may be taken so as to include information such as an SSID (Service Set Identifier) of the connection destination access point if already set.

Next, the information processing apparatus 101 executes the flow illustrated in FIG. 6 described above based on information acquired by the advertising information.

Next, the CPU 103 determines by the flow illustrated in FIG. 6 whether or not a presented function is selected. Here, the CPU 103 presents a selected function to the user in a case when it is determined to be selected. After this, GATT communication is performed and detailed information of the selected function is received. For example, at least setup information is obtained by the GATT communication in a case when printer setup is selected. By this, a setting of an access point as recited in the first embodiment, or other setup processing can be executed. Meanwhile, in a case when a presented function is determined not to be selected, the CPU 103 ends the processing.

By this, it becomes possible to present a dialogue which guides to execution of a function for which execution is recommended to the user. By virtue of the present embodiment, it is not necessary to execute GATT communication when the selected function is presented to the user. Accordingly, a pairing process is not displayed at a timing at which the user does not intend it to be. Also, the convenience of the user is not decreased even if the pairing process is executed because a GATT communication is performed at a timing at which processing becomes necessary. Also, it is possible to reduce the amount of information obtained by a GATT communication by performing the GATT communication after selecting a function.

Fourth Embodiment

In each foregoing embodiment, description is given regarding a configuration in which a function for which execution is recommended to a user is displayed in a presentation function selection dialog based on the state of the communication apparatus 151 and the state of a particular application. In contrast to this, in the present embodiment, description is given regarding processing for further changing the selection contents after selecting a function for which execution is recommended to the user in accordance with a screen of the printing application being displayed.

For example, the "display operation explanation" function of FIG. 8 is not presented when the detected printer list screen 430 (possible to execute the "printer setup" function) of the printing application of FIG. 4D is being displayed by user operation or the like. By this, it is possible to make a presentation that is more suitable with respect to the user operation. This is because there is a high probability that the user is operating the printing application to perform an operation that can be executed in the detected printer list screen 430 in such a case.

Figure 10:
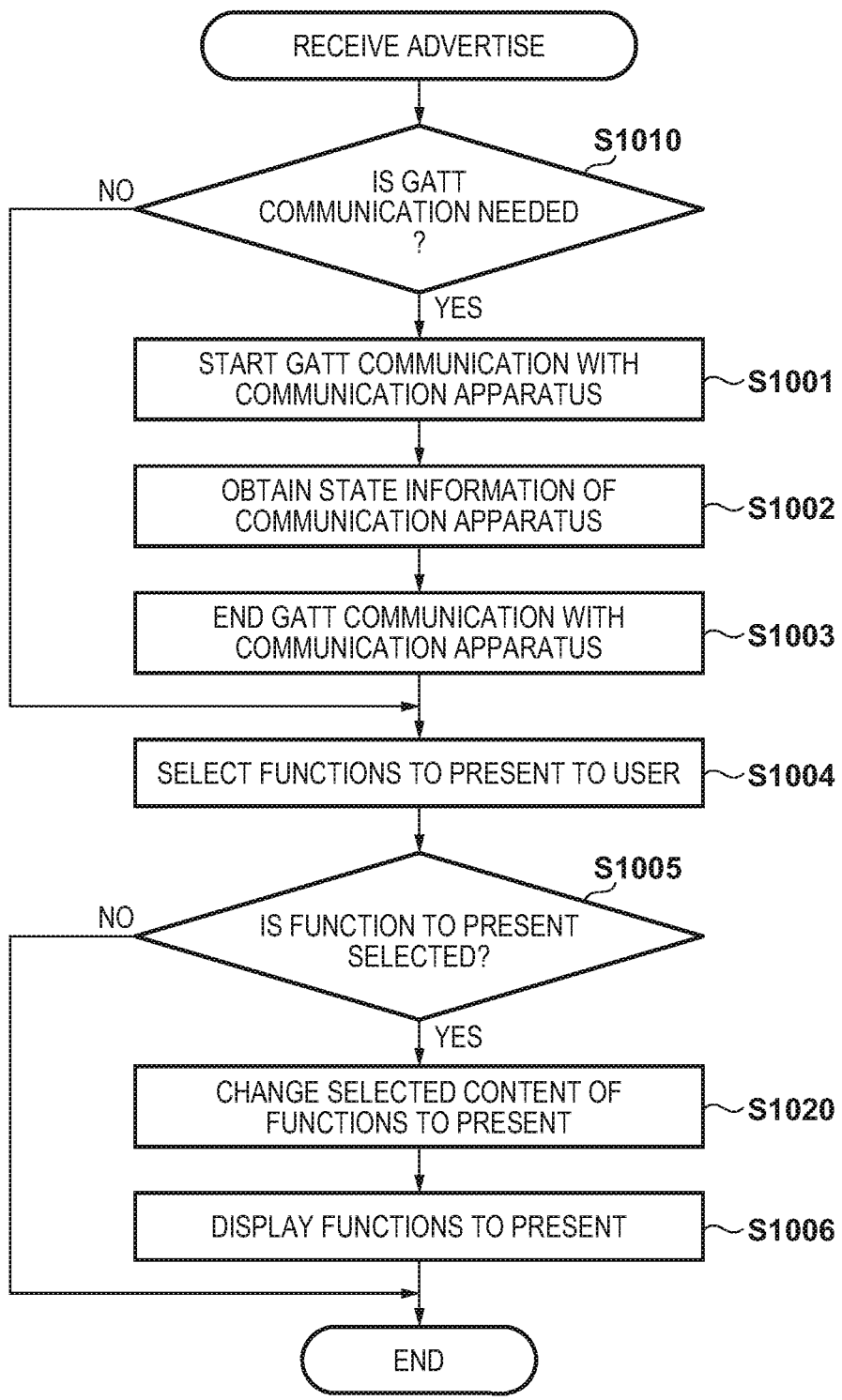
FIG. 10 is a flowchart illustrating processing that changes functions for which execution is recommended to a user.

FIG. 10 is a flowchart illustrating processing for changing, in accordance with the screen of the printing application being displayed, the functions for which execution is recommended to the user based on the state of the communication apparatus 151 and the state of a particular application in the present embodiment. The flowchart illustrated in FIG. 10 is realized by, for example, the CPU 103 reading a program that is stored in the ROM 104, the external storage apparatus 106 or the like into the RAM 105, and executing the program.

Firstly, in step S1010, the CPU 103 starts a GATT communication with the communication apparatus 151 that transmitted the received advertising information by the foregoing method. Then, the processing proceeds to step S1001. The processing of step S1001 through step S1005 is the same as the processing of step S501 through step S505, and therefore description thereof is omitted.

In a case when a function to present is selected in step S1005 (Yes in step S1005), the processing proceeds to step S1020. In step S1020, the CPU 103 performs processing for changing selection contents of the functions to present, for the functions to present to a user selected in step S1004, in accordance with a screen of the printing application being displayed. Then, in step S1006, the CPU 103 displays the functions to be present based on the changed selection contents.

FIG. 11 is a flowchart illustrating the processing performed in step S1020 for changing selection contents of functions to be presented, in accordance with a screen of the printing application being displayed. In step S1101, the CPU 103 lists and stores functions executable on a screen being displayed by the printing application. Here, the screen being displayed indicates a screen that the display unit 108 of the information processing apparatus 101 displays when the printing application detects a reception of advertising information transmitted from the communication apparatus 151. For example, in a case when the printer information screen 410 of the printing application illustrated in FIG. 4B is a screen that is being displayed, a "printer state" function and a "operation explanation" function are listed as functions that can be executed. Also, in a case when the detected printer list screen 430 of the printing application illustrated in FIG. 4D is a screen that is being displayed, only a "printer setup" function is listed as a function that can be executed.

In step S1102, the CPU 103 determines whether or not all functions that can be executed in the screen being displayed that are listed in step S1101 have been confirmed. Here, in a case when it is determined that all functions have already been confirmed, the processing proceeds to step S1106. Meanwhile, in a case when it is determined that there is an unconfirmed function, the processing proceeds to step S1103. In step S1103, the CPU 103 determines whether or not a focus function (a confirmation target function) that can be executed in the screen being displayed and was listed in step S1101 is included in the functions to present that were selected in step S1004. In a case when the confirmation target function was not selected as a function to be presented (NO in step S1103), the processing proceeds to step S1105, and a determination is made for the next function. Meanwhile, in a case when the confirmation target function is selected as a function to be presented (Yes in step S1103), the processing proceeds to step S1104.

In step S1104, the CPU 103 adds the confirmation target function to a prioritized display function list. Here, the prioritized display function list is a list of functions that can be executed in the screen that is being displayed, and functions to be presented that are selected in step S1004. Accordingly, it can be said to be a list of functions of the printing application for which it is determined there is a high probability that the user will execute the function. Next, the processing proceeds to step S1105, the next function out of the functions that can be executed in the screen being displayed that is listed in step S1101 is focused on, and the processing returns to step S1102.

In step S1106, the CPU 103 determines whether or not there is a function to present in the prioritized display function list. In the case when it is determined that the function to present is not in the prioritized display function list (No in step S1106), in other words in the case when no function was added to the prioritized display function list, the CPU 103 ends the processing of FIG. 11 without changing the content of the functions to be presented. In such a case, the functions selected in step S1004 are presented to the user as are. Meanwhile, in the case when it is determined that there are functions to be presented in the prioritized display function list (Yes in step S1106), in other words in the case when there is a function added to the prioritized display function list, the processing proceeds to step S1107. In step S1107, the CPU 103 discards the contents of the functions to be presented that are selected in step S1004, overwrites them with the contents of the prioritized display function list, and ends the processing of FIG. 11. By this, the selected contents of the functions to be presented that are displayed in step S1006 are changed. In this way, functions of the printing application that there is a higher probability that the user will execute are extracted by the functions to be presented being added to the prioritized display function list.

In this way, in the present embodiment, it becomes possible to present functions of the printing application that the user has a high probability of executing to the user preferentially by changing the selection contents of the functions to be presented in accordance with the screen of the printing application being displayed. Specifically, it becomes possible to present a dialogue which guides to functions that there is a higher possibility the user will execute. By this configuration, it becomes possible to reduce the function alternatives presented to the user, and it is possible to further improve user convenience.

Also, while configuration is taken in the present embodiment to change the selection contents of functions to be presented in accordance with a screen of the printing application being displayed, limitation is not made to this configuration. For example, configuration may be taken in which functions that can be executed in screens to which it is possible to transition from the screen that is being displayed are selected preferentially in the processing for changing the selection contents of the functions to be presented. Also, configuration may also be taken such that a priority order is arranged for functions that are the targets of selection as functions to be presented, and to set this priority order individually in accordance with the setting contents of the printing application and the state of the communication apparatus 151. By such a configuration, it becomes possible to decide in detail content that is presented as a function that the user is more likely to execute in accordance with a difference between functions of the printing application and the communication apparatus 151, and it becomes possible to improve the convenience of the user more.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-073181, filed Mar. 31, 2016, which is hereby incorporated by reference herein in its entirety.

What is claimed is:

1. A control method for an information processing apparatus that is able to execute a communication based on a Bluetooth standard as a first wireless communication standard and a communication based on a second wireless communication standard that is able to perform higher-speed communication than the first wireless communication standard, the method comprising;
   obtaining first information transmitted from a communication apparatus by the communication using the first wireless communication standard;
   causing a display unit to display a screen including an accepting item for accepting a user instruction, based on the obtained first information; and
   performing setup processing in which second information relating to an external access point is transmitted to the communication apparatus by the communication using the first wireless communication standard, after the user instruction is performed on the accepting item,
   wherein a connection using the second wireless communication standard, between the communication apparatus and the external access point, is performed based on the second information transmitted by the communication using the first wireless communication standard, whereby the information processing apparatus is able to communicate with the communication apparatus via the external access point by the communication using the second wireless communication standard.

2. The control method according to claim 1, wherein the second information is transmitted, by the communication using the first wireless communication standard, to the communication apparatus based on the obtained first information, after the user instruction is performed on the accepting item.

3. The control method according to claim 1, wherein the second information is information for causing the communication apparatus to connect with the external access point with which the information processing apparatus is being connected.

4. The control method according to claim 1, wherein a connection between the information processing apparatus and the communication apparatus is established using the first communication standard after the user instruction is performed on the accepting item.

5. The control method according to claim 1, wherein determination relating to a setting state of an application that is stored in a memory included in the information processing apparatus is further performed.

6. The control method according to claim 5, wherein determination relating to registration of a communication apparatus is performed as the determination relating to the setting state of the application.

7. The control method according to claim 6, wherein a screen for registering a communication apparatus in the application is displayed, in a case where the communication apparatus has not been registered in the application.

8. The control method according to claim 1, wherein the communication using the first communication standard is a communication based on Bluetooth Low Energy standard.

9. The control method according to claim 8, wherein the first information is included in advertising information transmitted from the communication apparatus by the communication based on the Bluetooth Low Energy standard.

10. The control method according to claim 1, wherein search processing for searching a communication apparatus that is being connected to the external access point is performed in a case where a predetermined user operation is performed.

11. The control method according to claim 1, wherein the second communication standard is Wi-Fi standard.

12. The control method according to claim 1, wherein the information processing apparatus is a smart phone.

13. The control method according to claim 1, wherein the communication apparatus is a printer.

14. An information processing apparatus that is able to execute a communication based on a Bluetooth standard as a first wireless communication standard and a communication based on a second wireless communication standard that is able to perform higher-speed communication than the first wireless communication standard, comprising:
at least one processor causing the information processing apparatus to act as;
an obtainment unit configured to obtain first information transmitted from a communication apparatus by the communication using the first wireless communication standard;
a display control unit configured to cause a display unit to display a screen including an accepting item for accepting a user instruction, based on the obtained first information; and
a performing unit configured to perform setup processing in which second information relating to an external access point is transmitted to the communication apparatus by the communication using the first wireless communication standard, after the user instruction is performed on the accepting item,
wherein a connection using the second wireless communication standard, between the communication apparatus and the external access point, is performed based on the second information transmitted by the communication using the first wireless communication standard, whereby the information processing apparatus is able to communicate with the communication apparatus via the external access point by the communication using the second wireless communication standard.

15. The information processing apparatus according to claim 14, wherein the second information is transmitted, by the communication using the first wireless communication standard, to the communication apparatus based on the obtained first information, after the user instruction is performed on the accepting item.

16. The information processing apparatus according to claim 14, wherein the second information is information for causing the communication apparatus to connect with the external access point with which the information processing apparatus is being connected.

17. The information processing apparatus according to claim 14, wherein a connection between the information processing apparatus and the communication apparatus is established using the first communication standard after the user instruction is performed on the accepting item.

18. The information processing apparatus according to claim 14, wherein determination relating to a setting state of an application that is stored in a memory included in the information processing apparatus is further performed.

19. The information processing apparatus according to claim 18, wherein determination relating to registration of a communication apparatus is performed as the determination relating to the setting state of the application.

20. The information processing apparatus according to claim 19, wherein a screen for registering a communication apparatus in the application is displayed, in a case where the communication apparatus has not been registered in the application.

21. The information processing apparatus according to claim 14, wherein the communication using the first communication standard is a communication based on Bluetooth Low Energy standard.

22. The information processing apparatus according to claim 21, wherein the first information is included in advertising information transmitted from the communication apparatus by the communication based on the Bluetooth Low Energy standard.

23. The information processing apparatus according to claim 14, wherein search processing for searching a communication apparatus that is being connected to the external access point is performed in a case where a predetermined user operation is performed.

24. The information processing apparatus according to claim 14, wherein the second communication standard is Wi-Fi standard.

25. The information processing apparatus according to claim 14, wherein the information processing apparatus is a smart phone.

26. The information processing apparatus according to claim 14, wherein the communication apparatus is a printer.

* * * * *